United States Patent
Inbavaluthi et al.

(10) Patent No.: US 12,475,888 B2
(45) Date of Patent: Nov. 18, 2025

(54) METHOD AND SYSTEM FOR AUTO-CORRECTION OF AN ONGOING SPEECH COMMAND

(71) Applicant: SAMSUNG ELECTRONICS CO., LTD., Suwon-si (KR)

(72) Inventors: Prashant Inbavaluthi, Noida (IN); Vikas Kapur, Noida (IN); Ramakant Singh, Noida (IN)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 258 days.

(21) Appl. No.: 18/244,063

(22) Filed: Sep. 8, 2023

(65) Prior Publication Data

US 2024/0127812 A1 Apr. 18, 2024

(30) Foreign Application Priority Data

Oct. 12, 2022 (IN) .............................. 202211058033

(51) Int. Cl.
| | | |
|---|---|---|
| *G10L 15/20* | (2006.01) | |
| *G10L 15/22* | (2006.01) | |
| *G10L 15/26* | (2006.01) | |

(52) U.S. Cl.
CPC .............. *G10L 15/22* (2013.01); *G10L 15/26* (2013.01); *G10L 2015/223* (2013.01); *G10L 2015/225* (2013.01)

(58) Field of Classification Search
CPC ....... G10L 15/187; G10L 15/20; G10L 15/26; G06F 40/10
See application file for complete search history.

(56) References Cited

U.S. PATENT DOCUMENTS

| | | | |
|---|---|---|---|
| 7,516,070 B2 * | 4/2009 | Kahn ................... | G06F 40/174 704/277 |
| 9,502,036 B2 | 11/2016 | Bao et al. | |

(Continued)

FOREIGN PATENT DOCUMENTS

WO 2021/104102 A1 6/2021

OTHER PUBLICATIONS

Matthew Lease et al., "Recognizing Disfluencies in Conversational Speech," IEEE Transactions on Audio, Speech, and Language Processing, vol. 14, No. 5, Sep. 2006, pp. 1566-1573.

(Continued)

*Primary Examiner* — Daniel Abebe
(74) *Attorney, Agent, or Firm* — Sughrue Mion, PLLC

(57) ABSTRACT

The system includes a voice assistant receiving a voice command as input from user. The speech to text convertor converts the voice command into a text. A feature extractor extracts acoustic features from raw waveform of voice command and textual features from converted text for determining nearby context tokens. A multi modal unified attention sequence tagger determines a connection between the audio and the text based on an individual contextual embedding and a fused contextual embedding at context tokens level. It further tags replacement, cue and correction words sequentially based on determined connection between the audio and the text. An on-the-fly decoder decodes revised text on-the-fly based on tagged replacement, cue and correction words, to display the decoded revised text on user interface and sends the decoded revised text to NLP to generate a response corresponding to the input speech.

20 Claims, 32 Drawing Sheets

(56) References Cited

U.S. PATENT DOCUMENTS

| | | | |
|---|---|---|---|
| 10,714,089 B2 | 7/2020 | Li | |
| 11,270,694 B2 * | 3/2022 | Kim et al. | |
| 12,334,076 B2 * | 6/2025 | Candelore | G10L 15/22 |
| 12,361,923 B2 * | 7/2025 | Lin | G10L 13/047 |
| 2008/0235021 A1 * | 9/2008 | Cross | G10L 15/22 |
| | | | 704/257 |
| 2020/0394258 A1 * | 12/2020 | Chen | G06F 40/284 |
| 2022/0383853 A1 | 12/2022 | Xu et al. | |

OTHER PUBLICATIONS

Parla Jamshit Lou et al., "End-to-End Speech Recognition and Disfluency Removal," arXiv:2009.10298v3 [eess.AS], Sep. 28, 2020 (Total 11 pages).

Priyanka Sen et al., "Semantic Parsing of Disfluent Speech," Proceedings of the 16th Conference of the European Chapter of the Association for Computational Linguistics, Apr. 19-23, 2021, pp. 1748-1753.

Junwei Liao et al., "Improving Readability for Automatic Speech Recognition Transcription," arXiv:2004.04438v1 [cs.CL],Apr. 9, 2020 (Total 11 pages).

Bret Kinsella et al., "Voice Assistant Consumer Adoption Report", Voicebot.AI, Nov. 2018 (Total 33 pages).

Bret Kinsella et al., "Smart Speaker Consumer Adoption Report," Voicebot.AI, Mar. 2019 (Total 34 pages).

* cited by examiner

Input
Consist B, I, O Tags

Fig. 1 Cue/Correctional Elements-BIO Tagged

| Words | BIO tags |
|---|---|
| What's | O |
| the | O |
| weather | O |
| In | O |
| Mumbai | B-Rep |
| ohh | B-Cue |
| sorry | B-Cue |
| New | B-Corr |
| Delhi | I-Corr |
| ? | O | convert →

Output
Note the missing I Tags.
Consists B, O Tags

Fig. 2 Cue/Correctional Blocks-BO Tagged

| Words | BIO tags |
|---|---|
| What's | O |
| the | O |
| weather | O |
| In | O |
| Mumbai | B-Rep |
| ohh sorry | B-Cue |
| New Delhi | B-Corr |
| ? | O |

FIG. 8D

Input
Consist B, O Tags

| Words | BO tags |
|---|---|
| What's | ○ |
| the | ○ |
| weather | ○ |
| In | ○ |
| Mumbai | B-Rep |
| ohh sorry | B-Cue |
| New Delhi | B-Corr |
| ? | ○ |

→ convert →

Output
Note the BO Tags now replaced with UX Tags as per sample repair visualization needs

| Words | What's | the | weather | In | Mumbai | ohh sorry | New Delhi | ? |
|---|---|---|---|---|---|---|---|---|
| UX tags | | | ○ | | yellow strike hide delete | red underline drop delete | move up pos offset - 2 move down | ○ |

METHOD AND SYSTEM FOR AUTO-CORRECTION OF AN ONGOING SPEECH COMMAND

CROSS-REFERENCE TO RELATED APPLICATION(S)

This application is based on and claims priority under 35 U.S.C. § 119(a) to Indian Patent Application No. 202211058033, filed on Oct. 12, 2022, in the Indian Patent Office, the disclosure of which is incorporated by reference herein in its entirety.

BACKGROUND

1. Field

The disclosure relates to auto-correction of an ongoing speech command, and, more particularly, to a system and a method for auto-correction of an ongoing speech command by applying multi modal fusion and self-attention on extracted text features and acoustic features from the ongoing speech command and determining cue words and correctional elements to be fed into an on-the-fly-decoder for correcting errors in the ongoing speech command.

2. Description of Related Art

A virtual personal assistant (VPA) is an application that understands voice commands and completes tasks for a user. In most cases, word correction is limited to context understanding, and thus, the intended interim sentence alteration is not handled. The users may need to rephrase the sentence again manually and may send a new voice command as per the new intended alteration. Leading qualities, which a user expects in a voice-based personal assistant, are how well the voice-based personal assistant understands the user; i.e., 1) the intention and human feel; 2) the speed of the response and the features (performances). Using the existing system raises the problem of more negative response and limits a human's level of interaction with virtual assistant (VA) system.

Additionally, the existing system provides voice assistants wherein a user can make mistakes or errors in the user's commands related to a context and its supporting parameters. When the current voice assistance provides inaccurate results, there is no way to backtrack or to correct the issue. It is also likely that the user alters the ongoing command with intended corrections which, in turn, may lead to side-effects during basic auto-correction and further downstream tasks like natural language understanding (NLU). The user may only wait for the correct and accurate results while the user is unaware whether the correction was understood by the voice assistants. This leads to low performance of the existing voice assistants.

For example, in FIG. 1, the application of a voice system is disclosed. It involves a two-step process that is an audio to text conversion and a natural language processing (NLP) based response. During both of the phases, the user command is treated as the final command and the correction intent is never understood. Further, the current NLP solution provides the context based spelling correction only and the voice assistant is incapable of understanding the sentence correction request and the voice assistant processes randomly based on the self-learnt context. This leads to some limitations such as inefficient processing and lack of focus on the correction context. In inefficient processing, all the queries follow same paths for reaching out to the required knowledgebase. The missing context and the sentence correction intent in query lead to searching incorrect request. The missing context in query may lead to mapping to the wrong response which internally gets treated as a success for later knowledge creation. Further, in lack of a focus on the correction context, the voice assistant still focuses on the context of the command, which, in result, always translates to a positive response and there is no context to drive the correction intent request on the virtual assistant.

Further, another technology in the related art, as seen in FIG. 2, represents an exemplary implementation of the conventional working of a voice assistant. Here, a user gives a command to a voice assistant by saying, "what's the weather in Mumbai oh sorry Delhi". The current voice assistant is incapable of detecting the disfluency in the command and it provides results for displaying "the weather in Mumbai" on the screen. Hence, the user has to repeat the command with the correction.

Furthermore, another technology of the related art shows how to model speech disfluencies using 'syntactic language modeling' and 'MaxEnt Ranker algorithm.' But the another technology uses traditional statistical modelling approaches and does not represent modern automatic speech recognition (ASR) pipelines. Another technology of the related art focuses on evaluation metrics needed to evaluate speech disfluency removal techniques and is a comparison study. The another study includes different forms of speech disfluency. This approach focuses more on evaluation methods and comparisons.

In view of the above deficiencies mentioned in the approaches in the related art, there is a need to have a technical solution to ameliorate one or more problems of the problems in the related art or to at least provide a solution to provide a system and a method for auto-correction of an ongoing speech command.

SUMMARY

Provided are a system and a method for auto-correction of an ongoing speech command or transcription by applying multi modal fusion and self-attention on extracted text features and acoustic features from the ongoing speech command and determining cue words and correctional elements to be fed into an on-the-fly-decoder for correcting errors in the ongoing speech command or transcription.

According to one aspect of the disclosure, a method for auto-correction of an ongoing speech command, includes: receiving, by a voice assistant, a voice command as an input from a user; converting, by a speech to text convertor, the voice command into a text; extracting, by a feature extractor, one or more acoustic features from a raw waveform of the voice command, wherein the acoustic feature is an audio; extracting, by the feature extractor, one or more textual features from the converted text for determining a plurality of nearby context tokens; determining, by a multi modal unified attention sequence tagger, a connection between the audio and the text based on an individual contextual embedding and a fused contextual embedding at the context tokens level; tagging, by the multi modal unified attention sequence tagger, a plurality of replacement, cue, and correction words sequentially based on the determined connection between the audio and the text; decoding, by an on-the-fly decoder, revised text on-the-fly, based on the tagged plurality of replacement, cue and correction words; displaying, by the on-the-fly decoder, the decoded revised text on a user interface; and sending, by the on-the-fly decoder, the decoded revised text to a natural language processing (NLP) for generating a response corresponding to an input speech.

The determining, by the multi modal unified attention sequence tagger, the connection between the audio and the text based on the individual contextual embedding and the fused contextual embedding at the context tokens level may include: generating, by the multi modal unified attention sequence tagger, an individual text contextual embedding and an individual audio contextual embedding, based on the plurality of nearby context tokens; generating, by the multi modal unified attention sequence tagger, a plurality of fused text contextual embedding and a fused audio contextual embedding, based on an interweave attention at each attention block from a plurality of attention blocks; merging, by the multi modal unified attention sequence tagger, the generated individual text contextual embedding with the fused text contextual embedding and the generated individual audio contextual embedding with the fused audio contextual embedding for obtaining a final text embedding and a final audio embedding respectively; generating, by the multi modal unified attention sequence tagger, a unified embedding by merging the final text embedding with the final audio embedding; and linking, by the multi modal unified attention sequence tagger, the plurality of attention blocks serially.

The converting, by the speech to text convertor, the voice command into the text may include recognizing the voice command from the raw waveform.

The one or more acoustic features may include at least one of pitch, note onsets, fluctuation patterns, stress, or intonation.

The extracting, by the feature extractor, the one or more acoustic features and the one or more textual features may include: extracting, by an acoustic feature extractor, mid-level audio features perceived by the user; identifying, by the acoustic feature extractor, a disfluent audio point that facilitates in indicating an error made by the user; and correcting, by the acoustic feature extractor, the error.

The extracting, by the feature extractor, the one or more acoustic features and the one or more textual features may include: converting, by a text feature extractor, the text into a plurality of numeric embeddings; and refining, by the text feature extractor, the numeric embeddings for identifying the replacement, cue and correction words.

The generating, by the multi modal unified attention sequence tagger, the individual text contextual embedding and the individual audio contextual embedding may include: establishing, by a unified embedding generator, a contextual relation between the plurality of context tokens of an input based on an attention map; and merging, by the unified embedding generator, the individual text and the individual audio contextual embedding based on the contextual relation for obtaining an output.

The attention map may be a matrix of size N×N may include a similarity of each token with the other plurality of context tokens.

Each attention block may learn improved embedding based on a plurality of modalities.

The generating, by the multi modal unified attention sequence tagger, the plurality of fused text contextual embedding and the fused audio contextual embedding, based on the interweave attention at each attention block from the plurality of attention blocks may include: establishing, by the unified embedding generator, a contextual relation between the plurality of context tokens of a first modality from the plurality of modalities to a second modality from the plurality of modalities based on the attention map; and merging, by the unified embedding generator, the fused text and the fused audio contextual embedding based on the contextual relation for obtaining an output.

The plurality of modalities may include at least one of audio modality or text modality.

The generating, by the multi modal unified attention sequence tagger, the unified embedding by merging the final text embedding with the final audio embedding may include: generating, by a sequence tagger, the context tokens may include information from the audio modality and the text modality, the context token features being used for tagging.

The decoding, by the on-the-fly decoder, the revised text on-the-fly, based on the tagged plurality of replacement, cue and correction words may include: predicting, by a beginning, inside, and outside (BIO) tag parser, a plurality of BIO tags based on conditional random field (CRF) model for determining the replacement, cue and correction words, wherein the CRF model is based on the plurality of serially linked attention blocks; and replacing, by a correction generator, the replacement words with the correction words and removing the cue words based on the predicted plurality of BIO tags.

The displaying, by the on-the-fly decoder, the decoded revised text on the user interface may include: revising the text with the predicted BIO tags; and arranging the BIO tags for creating a sequence of actions in the user interface.

According to another aspect of the disclosure, a system for auto-correction of an ongoing speech command, includes: a voice assistant configured to receive a voice command as an input from a user; a speech to text convertor configured to convert the voice command into a text; a feature extractor configured to: extract one or more acoustic features from a raw waveform of the voice command, wherein the acoustic feature is an audio; and extract one or more textual features from the converted text for determining a plurality of nearby context tokens; a multi modal unified attention sequence tagger configured to: determine a connection between the audio and the text based on an individual contextual embedding and a fused contextual embedding at the context tokens level; and tag a plurality of replacement, cue and correction words sequentially based on the determined connection between the audio and the text; and an on-the-fly decoder configured to: decode revised text on-the-fly based on the tagged plurality of replacement, cue and correction words; display the decoded revised text on a user interface; and send the decoded revised text to a natural language processing (NLP) to generate a response corresponding to an input speech.

The multi modal unified attention sequence tagger is further configured to: generate an individual text contextual embedding and an individual audio contextual embedding based on the plurality of nearby context tokens; generate a plurality of fused text contextual embedding and a fused audio contextual embedding based on an interweave attention at each attention block from a plurality of attention blocks; merge the generated individual text contextual embedding with the fused text contextual embeddings and the generated individual audio contextual embedding with the fused audio contextual embeddings to obtain a final text embedding and a final audio embedding respectively; generate a unified combined embedding by merging the final text embedding with the final audio embedding; and link the plurality of attention blocks serially.

The speech to text convertor is further configured to recognize the voice command from the raw waveform.

The feature extractor further may include an acoustic feature extractor which is configured to: extract mid-level audio features perceived by the user; identify a disfluent audio point that facilitates in indicating an error made by the user; and correct the error.

The feature extractor further may include a text feature extractor which is configured to: convert the text into a plurality of numeric embeddings; and refine the numeric embeddings for identifying the replacement, cue and correction words.

The multi modal unified attention sequence tagger may include a unified embedding generator which is configured to: establish a contextual relation between the plurality of context tokens of an input based on an attention map; and merge the individual text contextual embedding and the individual audio contextual embedding based on the contextual relation for obtaining an output.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 8B illustrates beginning, inside, and outside (BIO) tagged text sequence conversion, in accordance with one or more embodiments of the disclosure;

FIG. 8D illustrates user experience (UX) tagged block sequence annotation, in accordance with one or more embodiments of the disclosure;

Figure 1:
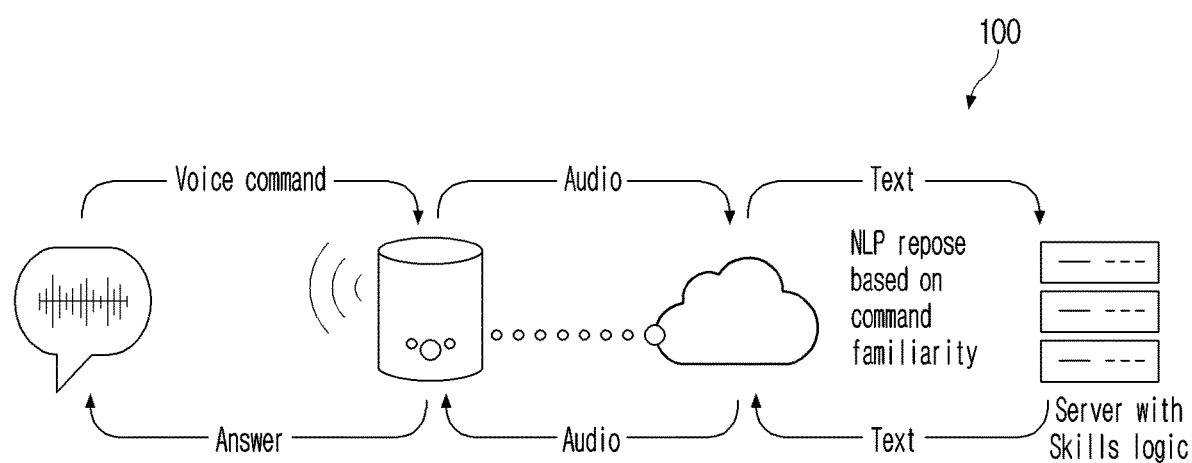
FIG. 1 illustrates a related art depicting the two-step process involved in an application of a voice system.
Figure 2:
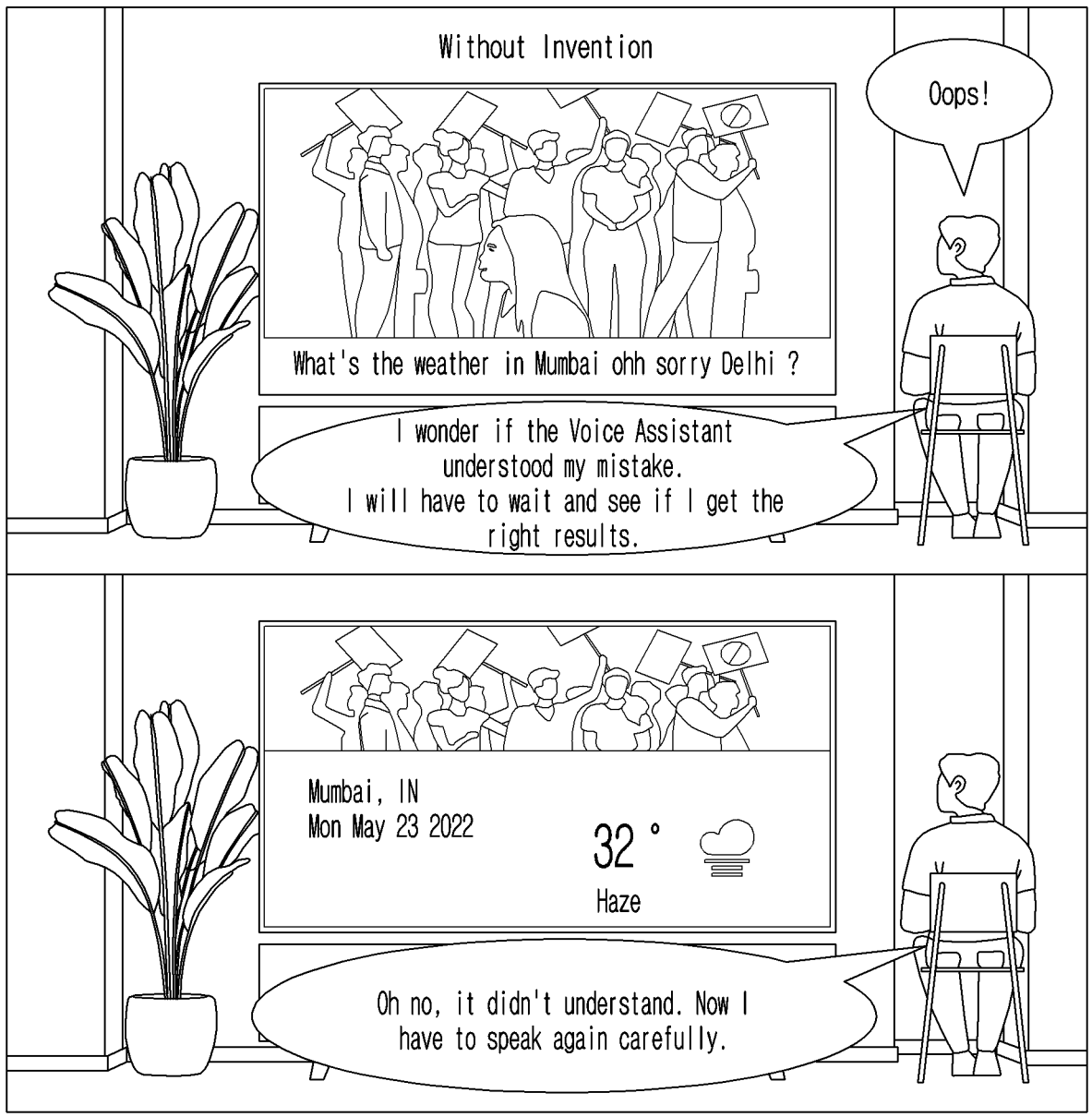
FIG. 2 illustrates a related art representing a conventional operation of a voice assistant.

Any block diagrams herein represent conceptual views of illustrative apparatuses embodying the principles of the disclosure. Similarly, it will be appreciated that any flow charts, flow diagrams, and the like represent various processes which may be substantially represented in computer readable medium and so executed by a computer or processor, whether or not such computer or processor is explicitly shown.

DETAILED DESCRIPTION

Before undertaking the detailed description below, it may be advantageous to set forth definitions of certain words and phrases used throughout the present disclosure. The term "couple" and the derivatives thereof refer to any direct or indirect communication between two or more elements, whether or not those elements are in physical contact with each other. The terms "transmit", "receive", and "communicate" as well as the derivatives thereof encompass both direct and indirect communication. The terms "include" and "comprise", and the derivatives thereof refer to inclusion without limitation. The term "or" is an inclusive term meaning "and/or". The phrase "associated with," as well as derivatives thereof, refer to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" refers to any device, system, or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of A, B, and C" includes any of the following combinations: A, B, C, A and B, A and C, B and C, and A and B and C, and any variations thereof. Similarly, the term "set" means one or more. Accordingly, the set of items may be a single item or a collection of two or more items.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as Read Only Memory (ROM), Random Access Memory (RAM), a hard disk drive, a Compact Disc (CD), a Digital Video Disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

The following is a detailed description of embodiments of the disclosure depicted in the accompanying drawings. The embodiments are in such detail as to clearly communicate the disclosure. However, the amount of detail offered is not intended to limit the anticipated variations of the embodiments, on the contrary, the intention is to cover all modifications, equivalents, and alternatives falling within the spirit and scope of the present disclosure as defined by the appended claims.

Provided are a system and a method for auto-correction of an ongoing speech command or transcription. The disclosure, more particularly, relates to a system and a method for auto-correction of an ongoing speech command or transcription by applying multi modal fusion and self-attention on extracted text features and acoustic features from the ongoing speech command and determining cue words and correctional elements to be fed into an on-the-fly-decoder for correcting errors in the ongoing speech command or transcription.

In the following description, for purpose of explanation, specific details are set forth in order to provide an understanding of the disclosure. It will be apparent, however, to one skilled in the art that the disclosure may be practiced without these details. One skilled in the art will recognize that embodiments of the disclosure, some of which are described below, may be incorporated into a number of systems.

However, the methods and systems are not limited to the specific embodiments described herein. Further, structures and devices shown in the figures are illustrative of exemplary embodiments of the disclosure and are meant to avoid obscuring of the disclosure.

Furthermore, connections between components and/or modules within the figures are not intended to be limited to direct connections. Rather, these components and modules may be modified, re-formatted or otherwise changed by intermediary components and modules.

Provided are an improved method and system for auto-correction of an ongoing speech command. For example, one or more embodiments herein may include one or more methods and systems for auto-correction of an ongoing speech command or transcription. In one of the embodiments, the method includes receiving a voice command as an input from a user by a voice assistant. It further includes converting the voice command into a text by a speech to text convertor. Then, extracting one or more acoustic features from a raw waveform of the voice command by a feature extractor. This acoustic feature is an audio. The method further includes extracting one or more textual features from the converted text by the feature extractor. These textual features are extracted for determining a plurality of nearby context tokens. Further, determining a connection between the audio and the text based on an individual contextual embedding and a fused contextual embedding at the context tokens level by a multi modal unified attention sequence tagger. Further, tagging a plurality of replacement, cue and correction words sequentially based on the determined connection between the audio and the text by the multi modal unified attention sequence tagger. Further, the method includes decoding a revised text on-the-fly based on the tagged plurality of replacement, cue and correction words by an on-the-fly decoder. Further, displaying the decoded revised text on a user interface and sending the decoded revised text to an NLP for generating a response corresponding to the input speech by the on-the-fly decoder.

In another embodiment, the operation of determining the connection between the audio and the text based on the individual contextual embedding and the fused contextual embedding at the context tokens level by the multi modal unified attention sequence tagger further includes generating an individual text contextual embedding and an individual audio contextual embedding based on the plurality of nearby context tokens. Then, generating a plurality of fused text contextual embedding and a fused audio contextual embedding based on an interweave attention at each attention block from a plurality of attention blocks. It further includes merging the generated individual text contextual embedding with the fused text contextual embedding and the generated individual audio contextual embedding with the fused audio contextual embedding for obtaining a final text embedding and a final audio embedding respectively. Further, it includes generating a unified embedding by merging the final text embedding with the final audio embedding and linking the plurality of attention blocks serially.

In another embodiment, the system includes a voice assistant that receives a voice command as an input from a user. It further includes a speech to text convertor that converts the voice command into a text. Further, a feature extractor that extracts one or more acoustic features from a raw waveform of the voice command and one or more textual features from the converted text for determining a plurality of nearby context tokens. This acoustic feature is an audio. The system further includes a multi modal unified attention sequence tagger that determines a connection between the audio and the text based on an individual contextual embedding and a fused contextual embedding at the context tokens level. It further tags a plurality of replacement, cue and correction words sequentially based on the determined connection between the audio and the text. The system further includes an on-the-fly decoder that decodes a revised text on-the-fly based on the tagged plurality of replacement, cue and correction words. It further displays the decoded revised text on a user interface and sends the decoded revised text to an NLP to generate a response corresponding to the input speech.

In another embodiment, the multi modal unified attention sequence tagger generates an individual text contextual embedding and an individual audio contextual embedding based on the plurality of nearby context tokens. It further generates a plurality of fused text contextual embedding and a fused audio contextual embedding based on an interweave attention at each attention block from a plurality of attention blocks. It merges the generated individual text contextual embedding with the fused text contextual embeddings and the generated individual audio contextual embedding with the fused audio contextual embeddings to obtain a final text embedding and a final audio embedding respectively. Further, it generates a unified combined embedding by merging the final text embedding with the final audio embedding. Further, it links the plurality of attention blocks serially.

In another embodiment, the disclosure aims at auto-correction of the ongoing speech command just like real world. Just like real world, the user can give command and the intended correction will take place on-the-fly. The system understands the correction command context and auto correct it with the intended correction. Some operations of the system are features extraction, multi modal unified attention sequence tagging and on-the-fly decoding. In features extraction, the input command must be evaluated for feature extraction. The standard acoustic features and the text features extraction is done for more accurate intend summary understanding. Further, the multi modal unified attention sequence tagging includes the mapping of the acoustic features and the text features and transforming into an enhanced embedding by applying multi modal fusion and individual attention on the extracted text features and acoustic features. Then, the replacement words, cue-words and correctional elements are determined. Further, the on-the-fly decoding includes correction decision based on the cue/correction BIO tagged words and embedding User experience (UX) tags in the text transcript for correcting errors in the input speech. The BIO [Beginning, Inside, Outside] is a tagging format for tagging tokens in a chunking task in computational linguistics.

The description merely illustrates the principles of the disclosure. Those skilled in the art will be able to devise one or more arrangements that, although not explicitly described herein, embody the principles of the disclosure. Furthermore, all examples recited herein are principally intended expressly to be only for explanatory purposes to help the reader in understanding the principles of the disclosure and the concepts contributed by the inventor to furthering the art and are to be construed as being without limitation to such specifically recited examples and conditions. Moreover, all statements herein reciting principles, aspects, and embodiments of the disclosure, as well as specific examples thereof, are intended to encompass equivalents thereof.

Figure 3A:
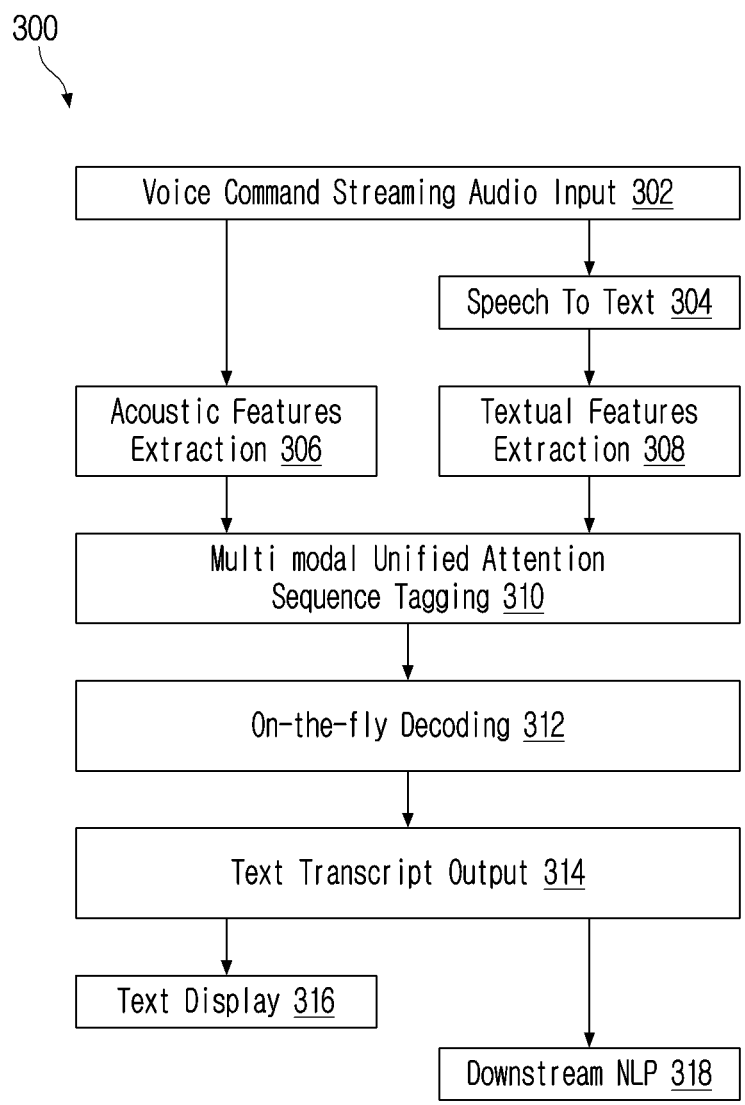
FIG. 3A illustrates an overall flow of the disclosure for processing a voice command and auto-correction of the voice command, in accordance with one or more embodiments of the disclosure.

FIG. 3A illustrates an overall flow of the disclosure for processing a voice command and auto-correction of the voice command, in accordance with one or more embodiments of the disclosure. At operation 302, the user provides a speech or voice command as an audio input. At operation 304, the speech or voice command is converted into text. At operation 306, a plurality of acoustic features is extracted from the raw waveform of the voice command. At operation 308, a plurality of textual features is extracted from the converted text. At operation 310, a connection between the audio and the text is determined based on an individual contextual embedding and a fused contextual embedding at a context tokens level. It also includes tagging a plurality of replacement, cue and correction words sequentially based on the determined connection between the audio and the text. At operation 312, revised text is decoded on-the-fly based on the tagged plurality of replacement, cue and correction words. At operation 314, the text transcript output is generated. At operation 316, the decoded revised text is displayed on a user interface. At operation 318, the decoded revised text is sent to an NLP for generating a response corresponding to the input speech.

Figure 3B:
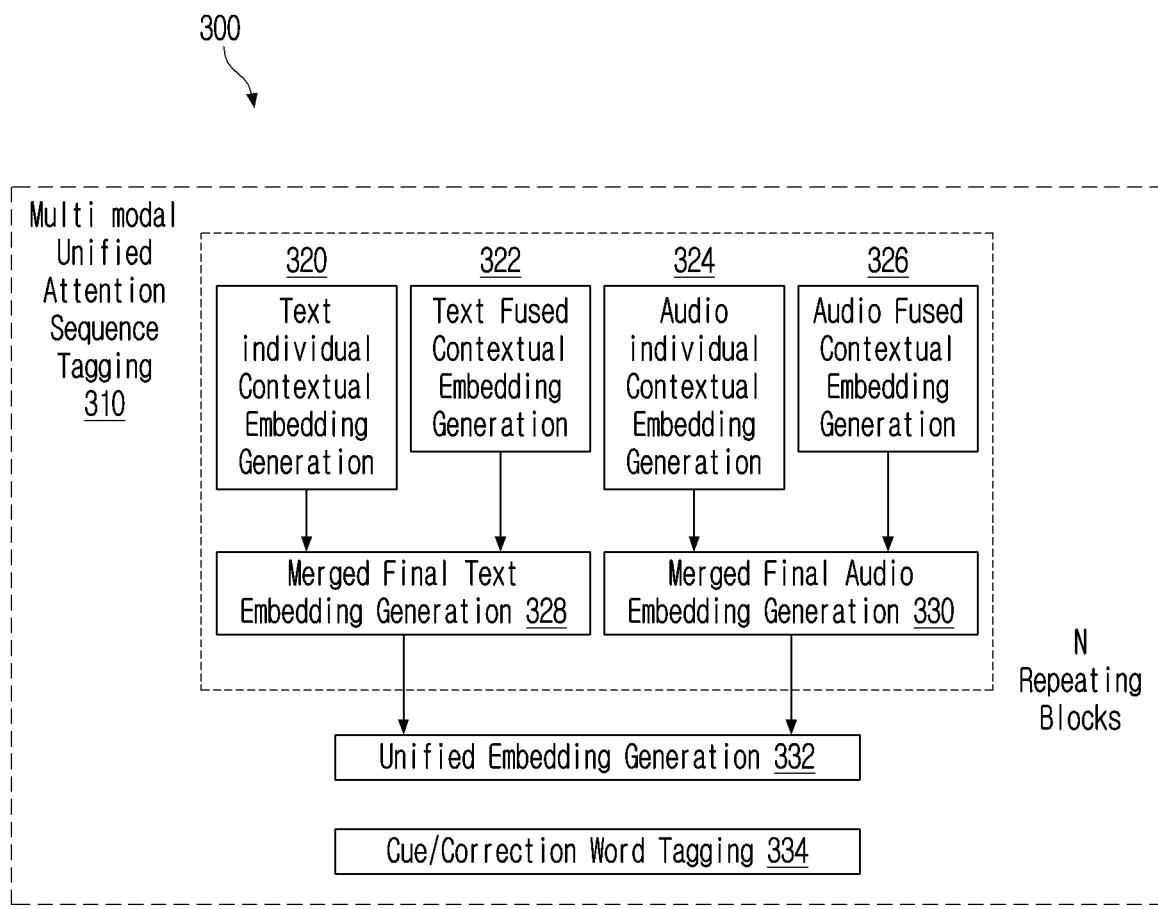
FIG. 3B illustrates a block diagram of the multi modal unified attention sequence tagging, in accordance with one or more embodiments of the disclosure.

FIG. 3B illustrates a block diagram of the multi modal unified attention sequence tagging, in accordance with one or more embodiments of the disclosure. The multi modal unified attention sequence tagging 310 includes the generation of an individual text contextual embedding 320 and an individual audio contextual embedding 324 based on the plurality of nearby context tokens. It further includes generation of a plurality of fused text contextual embedding 322 and a fused audio contextual embedding 326 based on an interweave attention at each attention block from a plurality of attention blocks. The multi modal unified attention sequence tagging 310 further includes the merging of the generated individual text contextual embedding 320 with the fused text contextual embedding 322 and merging of the generated individual audio contextual embedding 324 with the fused audio contextual embedding 326 for obtaining a merged final text embedding 328 and a merged final audio embedding 330, respectively. It further includes merging the final text embedding 328 with the final audio embedding 330 to generate a unified embedding 332. The plurality of attention blocks are linked serially. Further, a plurality of replacement, cue and correction words 334 are tagged for further processing.

Figure 3C:
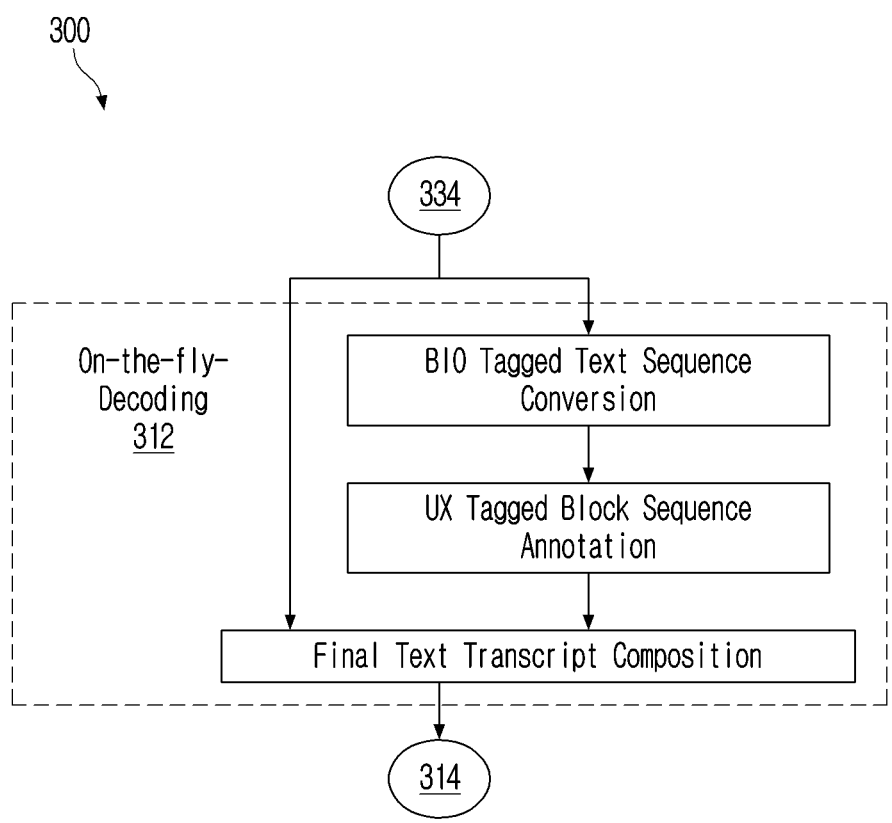
FIG. 3C illustrates a block diagram of the on-the-fly decoding, in accordance with one or more embodiments of the disclosure.

FIG. 3C illustrates a block diagram of the on-the-fly decoding, in accordance with one or more embodiments of the disclosure. The on-the-fly decoding 312 includes predicting a plurality of BIO tags based on Conditional Random Field (CRF) model for determining the replacement, cue and correction words. The CRF model is based on the plurality of serially linked attention blocks. It further includes replacing the replacement words with the correction words and removing the cue words based on the predicted BIO tags.

Figure 4:
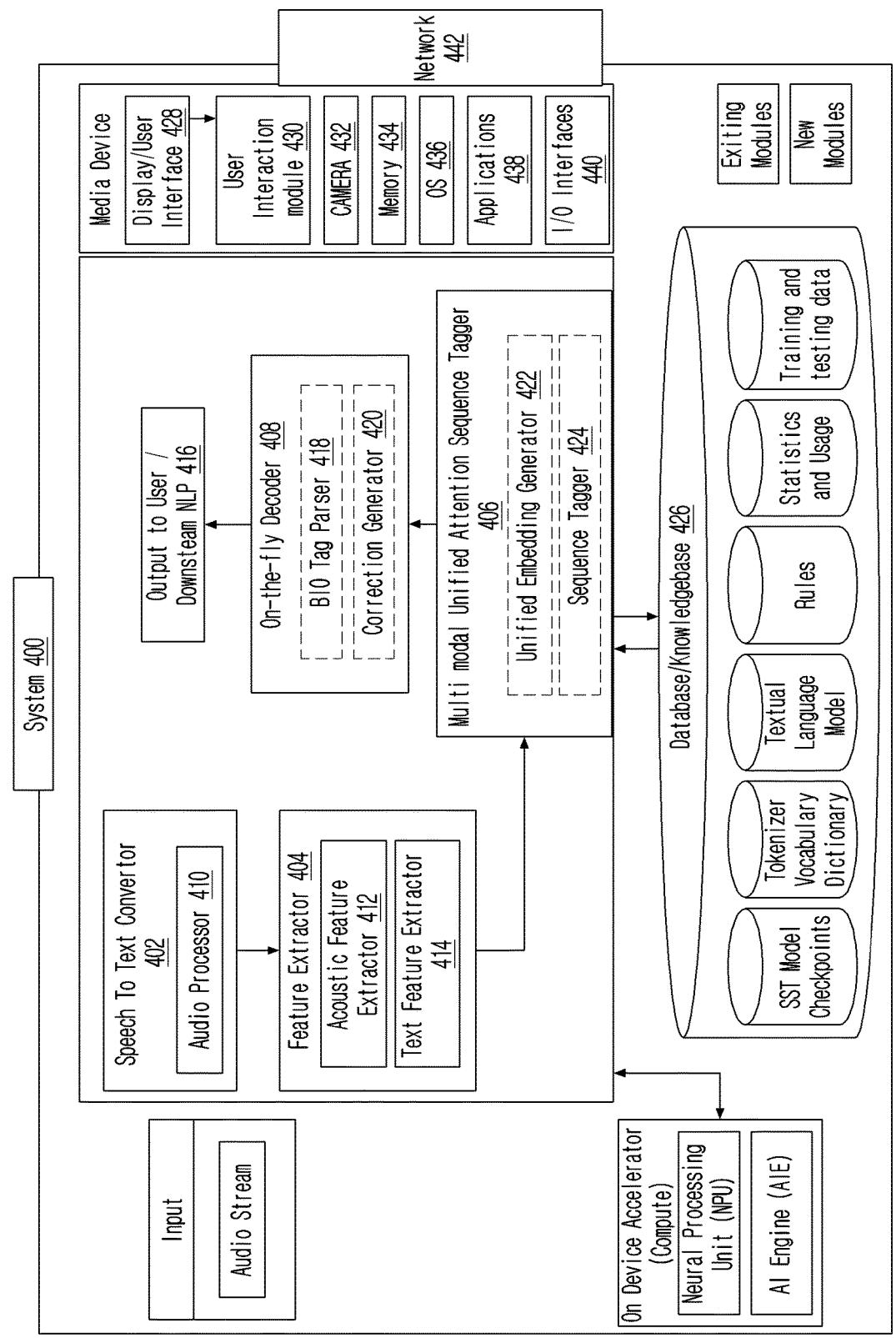
FIG. 4 illustrates an architectural block diagram of the overall system for auto-correction of an ongoing speech command, in accordance with one or more embodiments of the disclosure.

FIG. 4 illustrates an architectural block diagram of the overall system for auto-correction of an ongoing speech command, in accordance with one or more embodiments of the disclosure. This block diagram describes the four major components involved in the system disclosed in the disclosure. The first component is the speech to text convertor 402 which is configured to convert the voice command from a user into a text. This voice command is a raw audio waveform and it is received from a voice assistant. It also includes an audio processor 410 which is responsible for processing the voice command which is the audio input. The second component is the feature extractor 404 which is configured to extract one or more acoustic features from a raw waveform of the voice command. This acoustic feature is an audio. It further extracts one or more textual features from the converted text for determining a plurality of nearby context tokens. The third component is the multi modal unified attention sequence tagger 406 which is configured to determine a connection between the audio and the text based on an individual contextual embedding and a fused contextual embedding at the context tokens level. It is also responsible for tagging a plurality of replacement, cue and correction words sequentially based on the determined connection between the audio and the text. The fourth component is the on-the-fly decoder 408 which is configured to decode the revised text on-the-fly based on the tagged plurality of replacement, cue and correction words. It further displays the decoded revised text on a user interface.

In the present implementation, the system includes a voice assistant configured to receive a voice command as an input from a user. It further includes the speech to text convertor 402 which is configured to convert the voice command into a text. A feature extractor 404 is configured to extract one or more acoustic features from a raw waveform of the voice command, wherein the acoustic feature is an audio and to extract one or more textual features from the converted text for determining a plurality of nearby context tokens. The system further includes a multi modal unified attention sequence tagger 406 which is configured to determine a connection between the audio and the text based on an individual contextual embedding and a fused contextual embedding at the context tokens level. The multi modal unified attention sequence tagger 406 is further configured to tag a plurality of replacement, cue and correction words sequentially based on the determined connection between the audio and the text. The system further includes an on-the-fly decoder 408 which is configured to decode revised text on-the-fly based on the tagged plurality of replacement, cue and correction words, to display the decoded revised text on a user interface and to send the decoded revised text to an NLP to generate a response corresponding to the input speech.

In the present implementation, the acoustic features are the features which users can perceive and can help in identifying the audio point which are disfluent indicating that the user has made an error and trying to correct it. The acoustic features include pitch, note onsets, fluctuation patterns, stress, intonation, and the like. Further, the text features are the token level embedding of the command or transcript which is obtained by using a trained large language model and a rich set of text data.

Figure 5A:
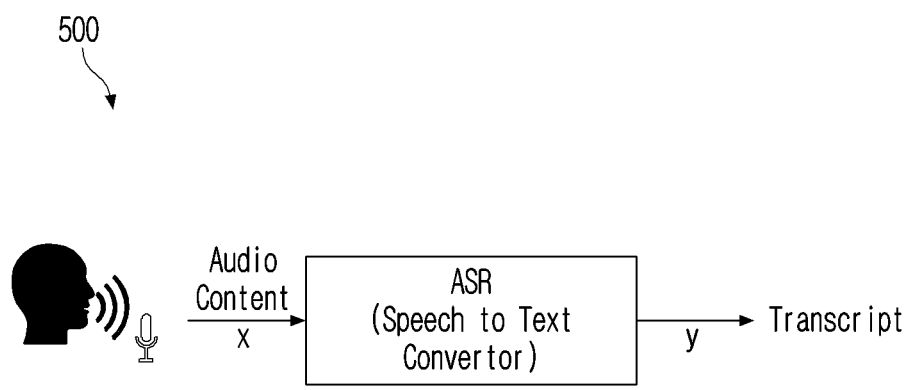
FIG. 5A illustrates an exemplary block diagram of the given input audio content and the output via a speech to text convertor, in accordance with one or more embodiments of the disclosure.

FIG. 5A illustrates an exemplary block diagram of the given input audio content and the output via a speech to text convertor, in accordance with one or more embodiments of the disclosure. The speech to text convertor 402 is an automatic speech recognition (ASR) tool. The input fed in the ASR is the audio content and the output is a text. The aim of the ASR is converting the speech signal i.e., the voice command into its corresponding sequence of words which is the text. It helps in handling domain specific jargons and vocabulary.

Figure 5B:
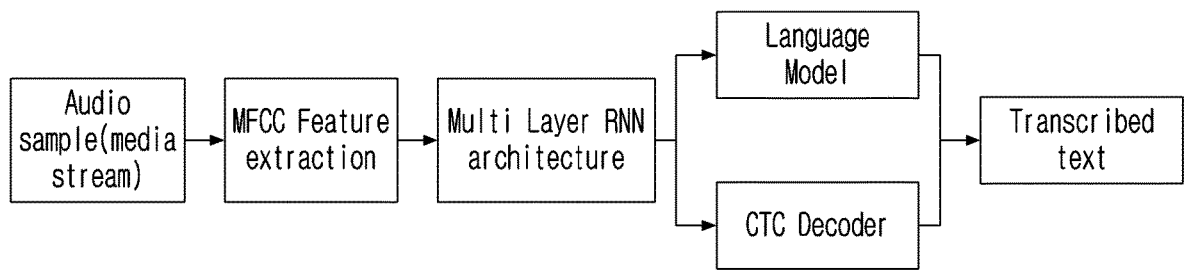
FIG. 5B illustrates an exemplary block diagram of fine tuning the audio input for handling domain specific vocabulary, in accordance with one or more embodiments of the disclosure.

FIG. 5B illustrates an exemplary block diagram of fine tuning the audio input for handling domain specific vocabulary, in accordance with one or more embodiments of the disclosure. The audio from a number of files or raw media streams are pre-processed using various mel-frequency cepstral coefficients (MFCC) feature extraction techniques and then fed to a recurrent neural networks (RNN) layer based architecture which results in decoding a sequence of characters or words. The goal of the RNN utilized in the disclosure is to convert an input sequence x into a sequence of character probabilities for the transcription y, with y=P (c|x) and c refers to character from vocabulary. A connectionist temporal classification (CTC) loss function along with an Adam optimizer is used for calculating a plurality of gradients using back propagation. This language model provides the probabilities for sequence of characters to make the model understand the context better.

Figure 6A:
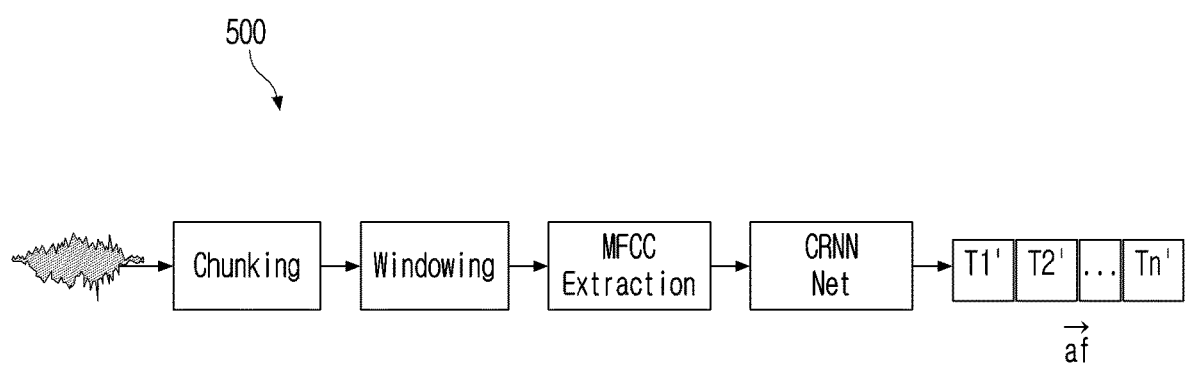
FIG. 6A illustrates a schematic block diagram of the process of extracting the acoustic features by the feature extractor, in accordance with one or more embodiments of the disclosure.

FIG. 6A illustrates a schematic block diagram of the process of extracting the acoustic features by the feature extractor, in accordance with one or more embodiments of the disclosure. The input of this block the audio content (a) and the output is the audio feature vector $\vec{(af)}$ of size N. The speech to text convertor 402 comprises an acoustic feature extractor 412. The acoustic feature extractor 412 is configured to extract mid-level audio features perceived by the user and to identify the disfluent audio point that facilitates in indicating that the user has made an error. It is further configured to correct the error made by the user. The acoustic features in the voice command like stress, intonation, pitch, note onsets, fluctuation patterns are further refined and used to identify replacement, cue and correction words in the downstream task.

Figure 6B:
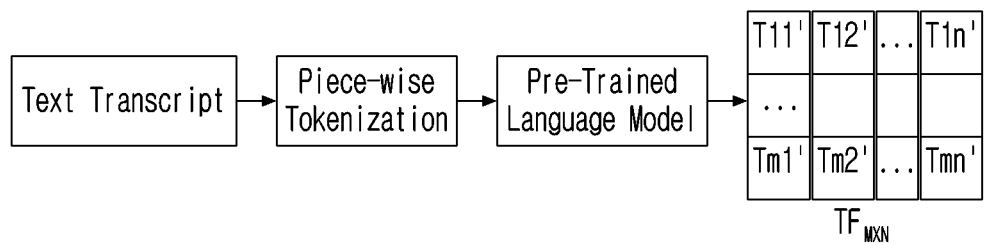
FIG. 6B illustrates a schematic block diagram of the process of extracting the textual features by the feature extractor, in accordance with one or more embodiments of the disclosure.

FIG. 6B illustrates a schematic block diagram of the process of extracting the textual features by the feature extractor, in accordance with one or more embodiments of the disclosure. The input of this block the text transcript (t) and the output is the text embedding matrix ($TF_{M \times N}$), where M is the number of context tokens where N is the embedding size. The speech to text convertor 402 comprises a text feature extractor 414. The text feature extractor 414 is configured to convert the text into a plurality of numeric embeddings. These embeddings are contextual representation of context tokens generated using the trained large language model and the rich set of text data. Further, the numeric embeddings are refined for downstream task of identifying the replacement, cue and correction words.

Figure 7A:
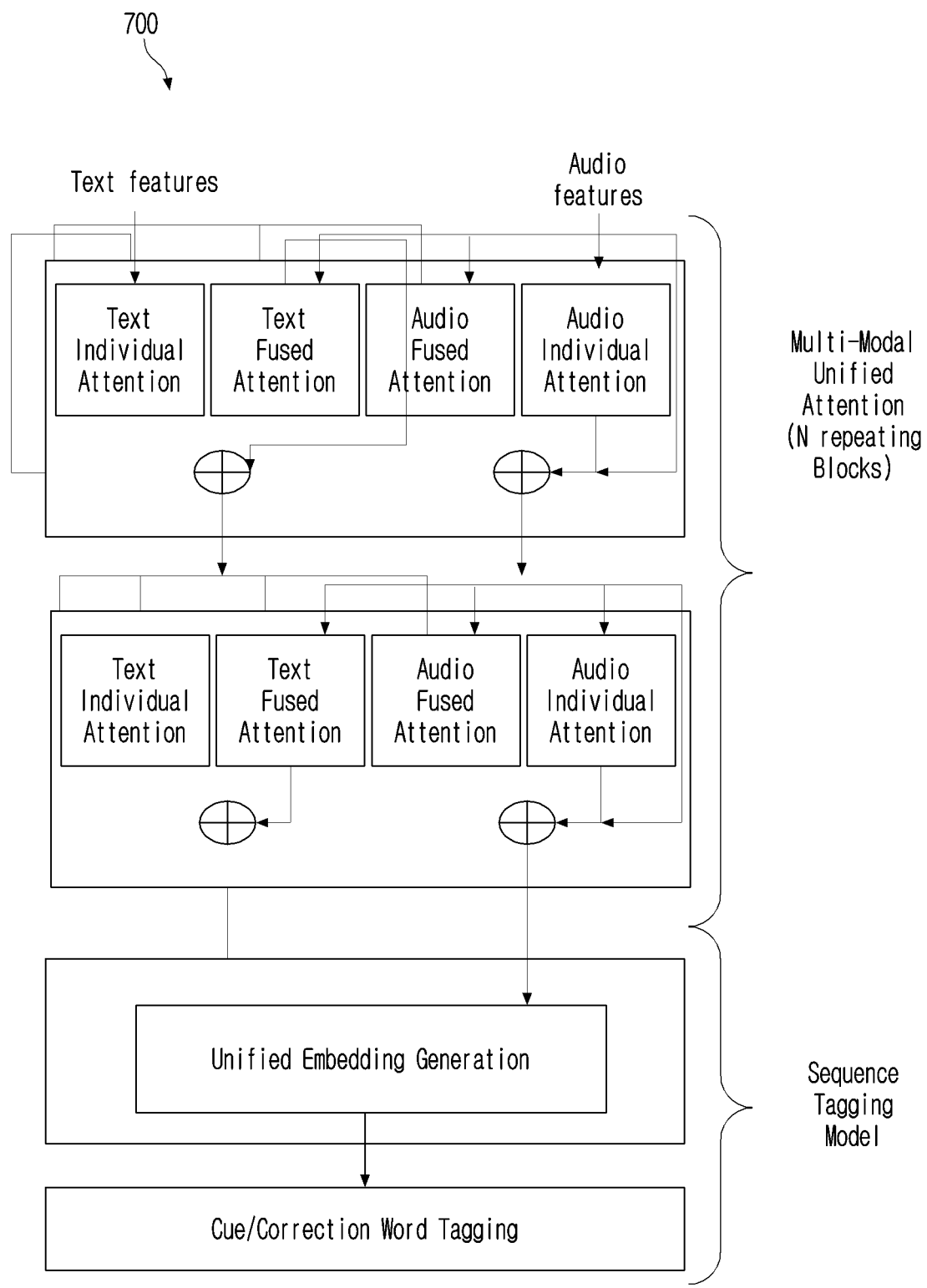
FIG. 7A is an illustration of the operations of determining the connection between the audio and the text based on the individual contextual embedding and the fused contextual embedding at the context tokens level by the multi modal unified attention sequence tagger, in accordance with one or more embodiments of the disclosure.

FIG. 7A illustrates the operations of determining the connection between the audio and the text based on the individual contextual embedding and the fused contextual embedding at the context tokens level by the multi modal unified attention sequence tagger, in accordance with one or more embodiments of the disclosure. The input of this block the audio features $\vec{(af)}$, text features ($TF_{M \times N}$) and the output is the BIO tags corresponding to the replacement, correction and cue words. The aim of this block is to build a lightweight fused multi-modal model which jointly align and learn audio and text features together. This fused feature is input to the CRF method to tag the sequence of tokens.

Figure 7B:
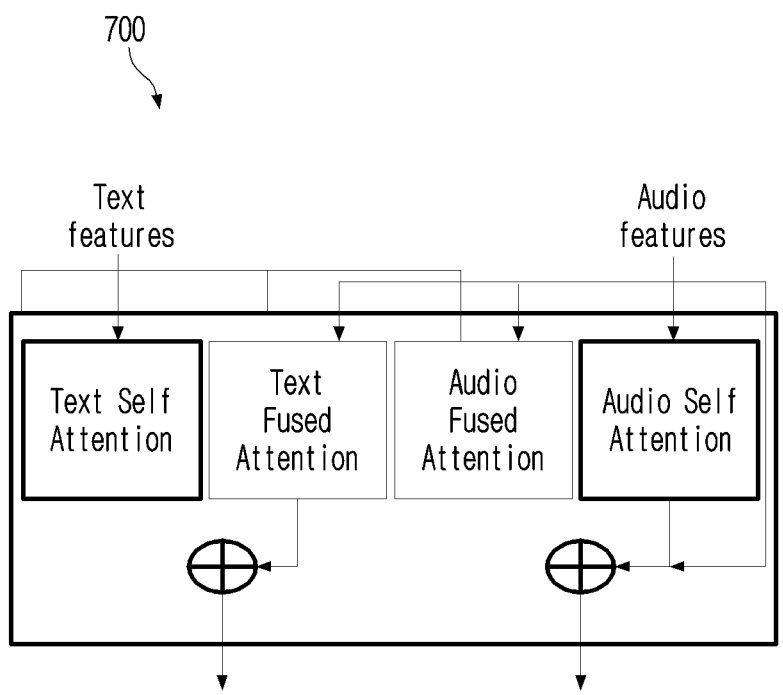
FIG. 7B illustrates a schematic block diagram of the generation of the individual audio contextual embedding and the individual text contextual embedding, in accordance with one or more embodiments of the disclosure.

FIG. 7B illustrates a schematic block diagram of the generation of the individual audio contextual embedding and the individual text contextual embedding, in accordance with one or more embodiments of the disclosure. This method includes the generation of the individual audio contextual embedding and the individual text contextual embedding based on the plurality of nearby context tokens. The operations for generating fine-tuned individual embedding for audio and text includes establishing how a plurality of elements which are the context tokens of the input are contextually related to one another using an attention map. It further includes merging, recombining, or recomposing the individual text contextual embedding and the individual audio contextual embedding based on the established contextual relation for obtaining the output.

Figure 7C:
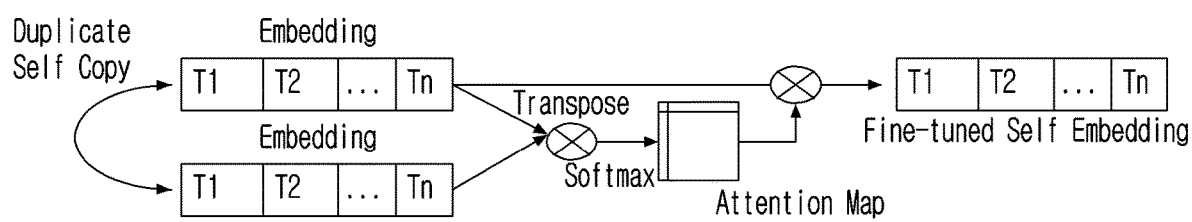
FIG. 7C is an illustration of generating a fine-tuned individual contextual embedding for audio and text, in accordance with one or more embodiments of the disclosure.

FIG. 7C is an illustration of generating a fine-tuned individual contextual embedding for audio and text, in accordance with one or more embodiments of the disclosure. As shown in FIG. 7C, the input token embedding values are T1, T2 . . . Tn. For audio, the token embedding values are obtained by using the acoustic features. For text, the token embedding values are obtained by using the large text based language model. The attention map is a matrix of size N×N containing similarity of each token with all other tokens. A SoftMax function makes the values in the attention map range between 0 and 1, where 0 indicates that the tokens are not related and 1 indicates that the tokens are highly correlated. Further, the output token is obtained by recomposing the input token embedding using the attention map. Thus, the embedding includes the contextual information which is useful in efficient capturing of the sequence structure of the tokens as the individual tokens in the speech and text are not mutually exclusive, but they depend on each other. The attention map allows capturing this dependency.

Figure 7D:
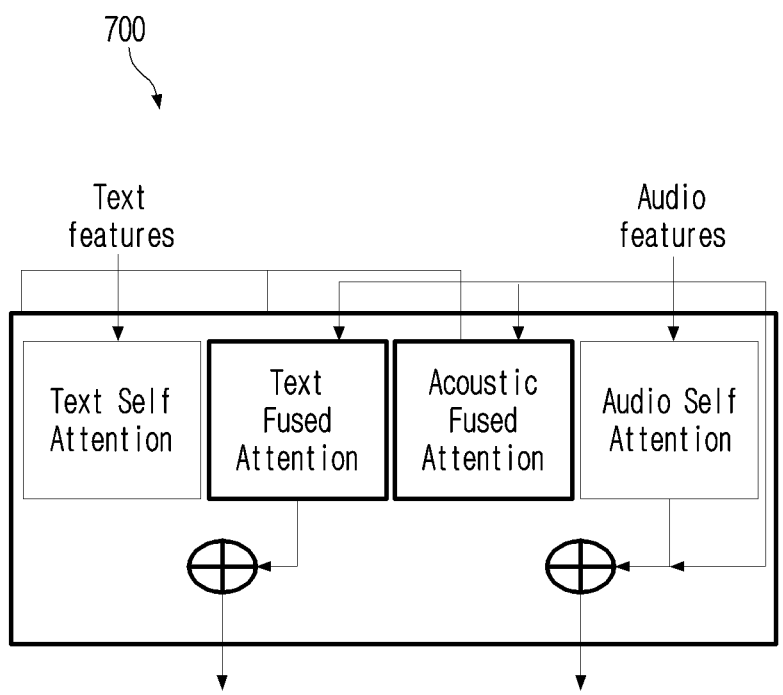
FIG. 7D illustrates a schematic block diagram of the generation of the fused audio contextual embedding and the fused text contextual embedding, in accordance with one or more embodiments of the disclosure.

FIG. 7D illustrates a schematic block diagram of the generation of the fused audio contextual embedding and the fused text contextual embedding, in accordance with one or more embodiments of the disclosure. This method includes the generation of a plurality of fused text contextual embedding and a fused audio contextual embedding based on an interweave attention at each attention block from a plurality of attention blocks. Each attention block learns improved embedding based on a plurality of modalities. The plurality of modalities includes audio modality, text modality, and the like. The operations for generating fine-tuned fused embedding for audio and text includes establishing a contextual relation between the plurality of context tokens of a first modality from the plurality of modalities to a second modality from the plurality of modalities based on the attention map. It further includes merging or recombining or recomposing the fused text and the fused audio contextual embedding based on the contextual relation for obtaining the output.

Figure 7E:
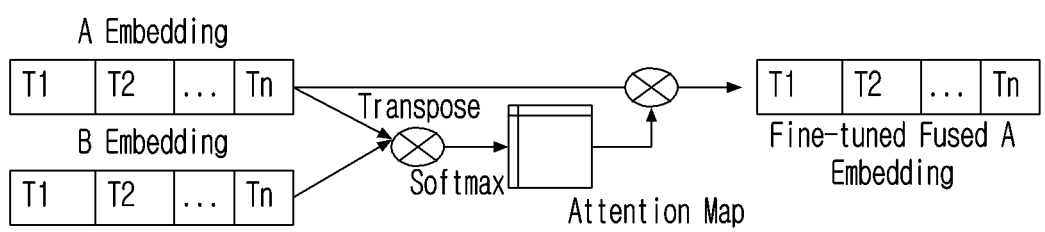
FIG. 7E is an illustration of generating a fine-tuned fused contextual embedding for audio and text, in accordance with one or more embodiments of the disclosure.

FIG. 7E is an illustration of generating a fine-tuned fused contextual embedding for audio and text, in accordance with one or more embodiments of the disclosure. As shown in FIG. 7E, for audio, 'A' embedding values are obtained by using the acoustic features and 'B' embedding values are obtained by using the large text based language model. For text, the 'A' embedding values are obtained by using the large text based language model and 'B' embedding values are obtained by using the acoustic features. The attention map is a matrix of size N×N containing similarity of each token of 'A' with all other tokens of 'B'. The SoftMax function makes the values in the attention map range between 0 and 1, where 0 indicates that the tokens are not related and 1 indicates that the tokens are highly correlated. Further, the output token is obtained by recomposing the input token embedding 'A' using the attention map. Thus, the embedding includes the multi-modal contextual information which is useful in efficient capturing of the sequence structure of the tokens as there is a natural correlation between the text tokens and the audio tokens. The attention map allows capturing this dependency.

Figure 7F:
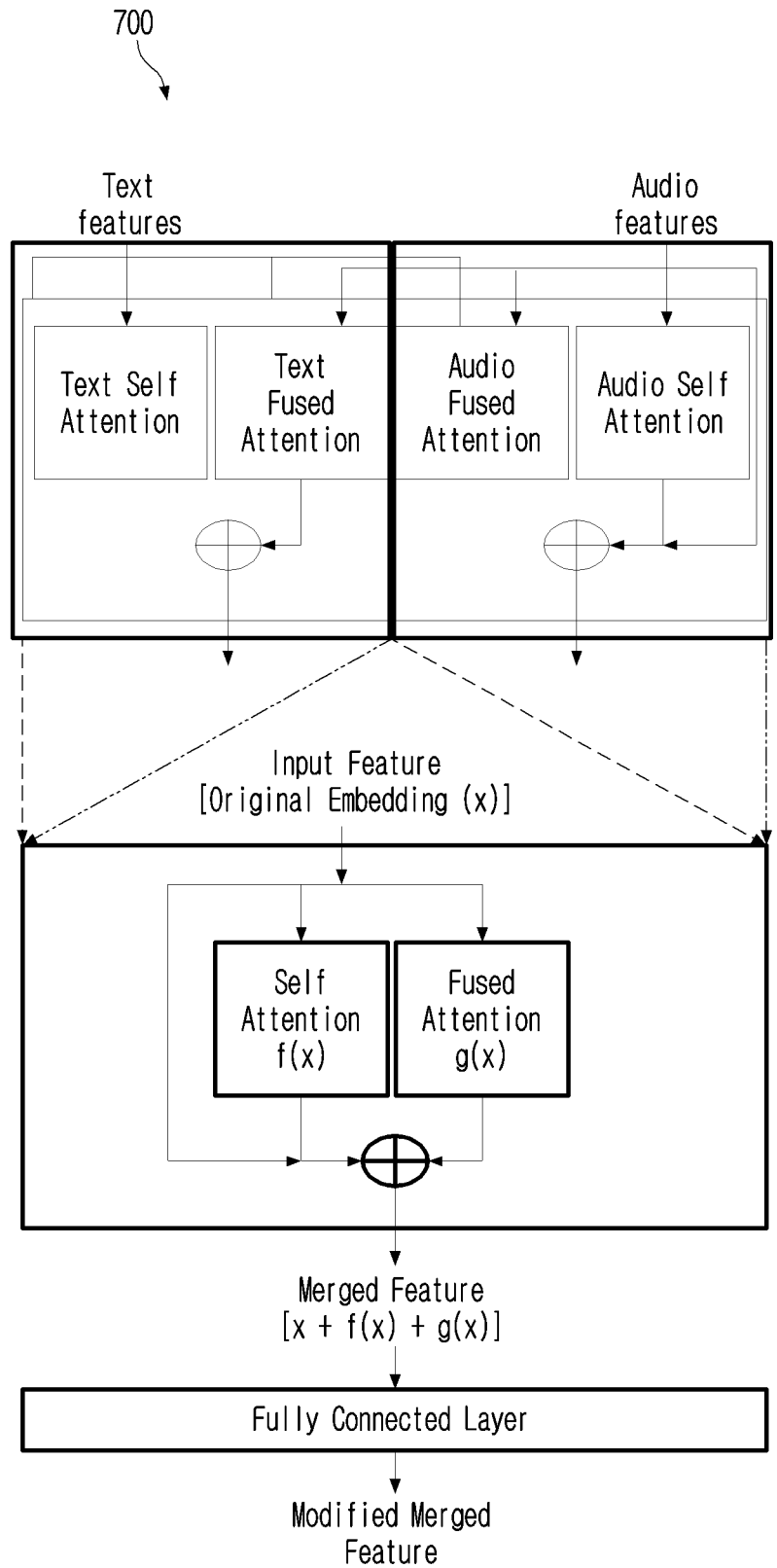
FIG. 7F illustrates a schematic block diagram of the generation of the merged embedding, in accordance with one or more embodiments of the disclosure.

FIG. 7F illustrates a schematic block diagram of the generation of the merged embedding, in accordance with one or more embodiments of the disclosure. This method includes merging the generated individual text contextual embedding with the fused text contextual embedding and the generated individual audio contextual embedding with the fused audio contextual embedding for obtaining a final text embedding and a final audio embedding respectively. This operation is performed by the multi modal unified attention sequence tagger 406.

Figure 7G:
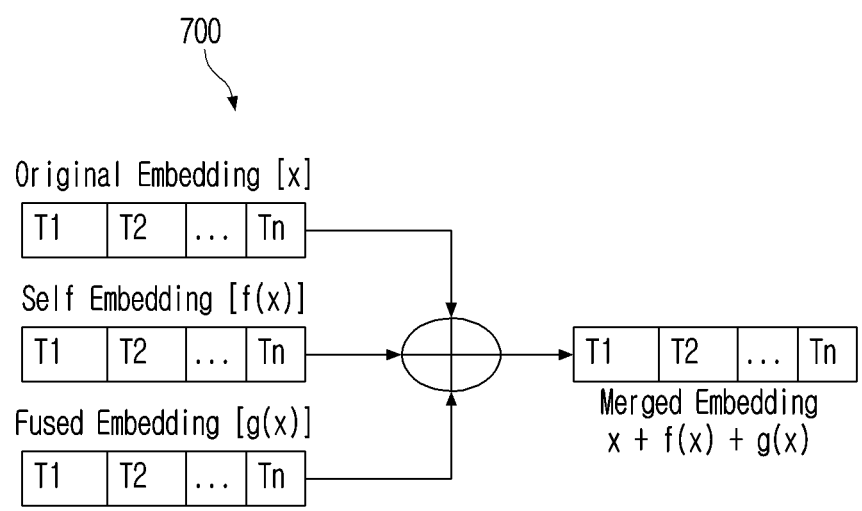
FIG. 7G is an illustration of merging the output from the individual contextual embeddings with the fused contextual embeddings, in accordance with one or more embodiments of the disclosure.

FIG. 7G is an illustration of merging the output from the individual contextual embeddings with the fused contextual embeddings, in accordance with one or more embodiments of the disclosure. This method is responsible for merging the output from individual attention blocks and the fused attention blocks. The attention blocks are the contextual embeddings for audio and text. The original embedding is added while merging for enabling the network to converge faster.

Figure 7H:
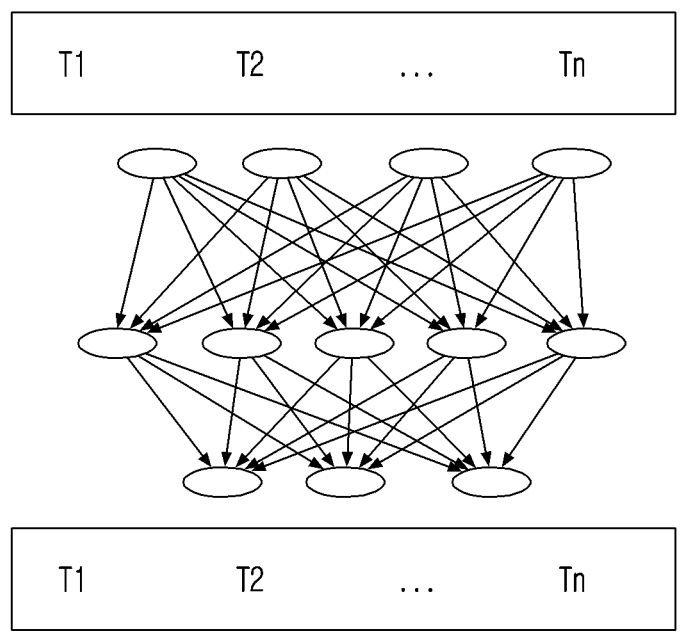
FIG. 7H is an illustration of reducing the dimension of the merged embedding to the original embedding, in accordance with one or more embodiments of the disclosure.

FIG. 7H is an illustration of reducing the dimension of the merged embedding to the original embedding, in accordance with one or more embodiments of the disclosure. In FIG. 7H, the dimension of the merged embedding is reduced to the original embedding by applying fully connected layers. Thus, the merged embedding is [x+f(x)+g(x)], wherein the size is 3 times the size of (x) and the modified merged embedding is [x+f(x)+g(x)] wherein the size is size of (x).

Figure 7I:
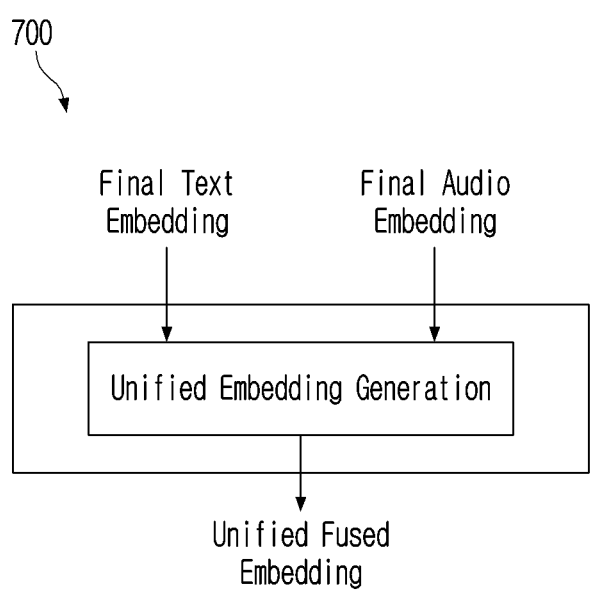
FIG. 7I illustrates a schematic block diagram of the generation of the unified embedding, in accordance with one or more embodiments of the disclosure.

FIG. 7I illustrates a schematic block diagram of the generation of the unified embedding, in accordance with one or more embodiments of the disclosure. This method describes the pre-processing part of the sequence tagging model and is responsible for generating the unified fused embedding by fusing the final text embedding and the final audio embedding before feeding to the multi modal unified attention sequence tagger 406. The final text embedding and the audio embedding is generated by re-applying the previous operation of merging the generated individual text contextual embedding with the fused text contextual embedding and the generated individual audio contextual embedding with the fused audio contextual embedding, 3×N-times to increase the depth of the model. This enables the learning of complex embedding representations. Further, the unified embedding produces the multi-modal independent features i.e., the token features that contain mixed information from the audio modality and the text modality. This information is further used to tag sequence.

Figure 7J:
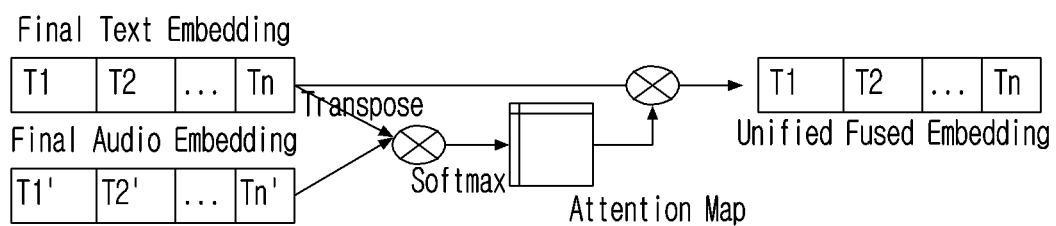
FIG. 7J is an illustration of generating a unified embedding, in accordance with one or more embodiments of the disclosure.

FIG. 7J is an illustration of generating a unified embedding, in accordance with one or more embodiments of the disclosure. The final text embedding is the text embedding generated by applying the previous operation of merging the generated individual text contextual embedding with the fused text contextual embedding and the generated individual audio contextual embedding with the fused audio contextual embedding, 3×N-times. Further, the final audio embedding is the audio embedding generated by applying the previous operation of merging the generated individual text contextual embedding with the fused text contextual embedding and the generated individual audio contextual embedding with the fused audio contextual embedding, 3×N-times. The SoftMax function makes the values in the attention map range between 0 and 1, where 0 indicates that the tokens are not related and 1 indicates that the tokens are highly correlated. Further, the output token is obtained by recomposing the input token embedding using the attention map.

Figure 7K:
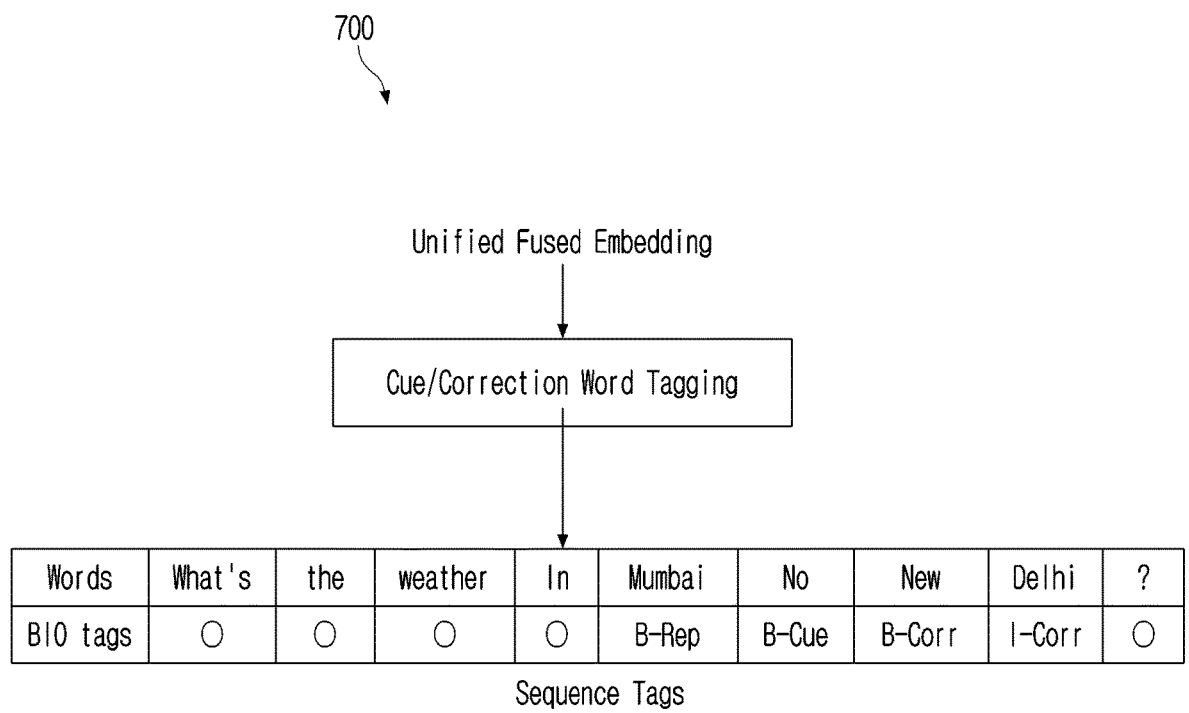
FIG. 7K illustrates a schematic block diagram of the tagging of the of replacement, cue and correction words, in accordance with one or more embodiments of the disclosure.

FIG. 7K illustrates a schematic block diagram of the tagging of the of replacement, cue and correction words, in accordance with one or more embodiments of the disclosure. This method includes CRF based discriminative classification models to predict the BIO tags. The BIO tagging format for tagging tokens represents B-Beginning of sequence, I-Inside of sequence, O-Outside of sequence. As shown in the FIG. 7K, the Rep is the replacement word for e.g.: {B-Rep (Mumbai)}, Corr is the correct word for e.g.: {B-Corr (New), I-Corr (Delhi)}, Cue is the cue word to be removed for e.g.: {B-Cue(no)}. This definition allows to replace the replacement words with the correct words and remove the cue words. Further, the CRF based Discriminative Classification model takes into consideration few information to generate good predictions. One of the information is that the BIO tag chosen earlier in sequence is to make the next decision of predicting the next BIO tag in the sequence. Another information is maximizing the probability of whole sequence of decisions as follows:

$$p(y|x) = \underbrace{\frac{1}{Z(x)}}_{Normalization} \prod_{t=1}^{T} \exp\left\{\sum_{k=1}^{K} \underbrace{\theta_k f_k}_{Weight} \underbrace{(y_t, y_{t-1}, x_t)}_{Feature}\right\}$$

Where, y is the tag to predict; x is observed variable entities or other tags around it.

Figure 8A:
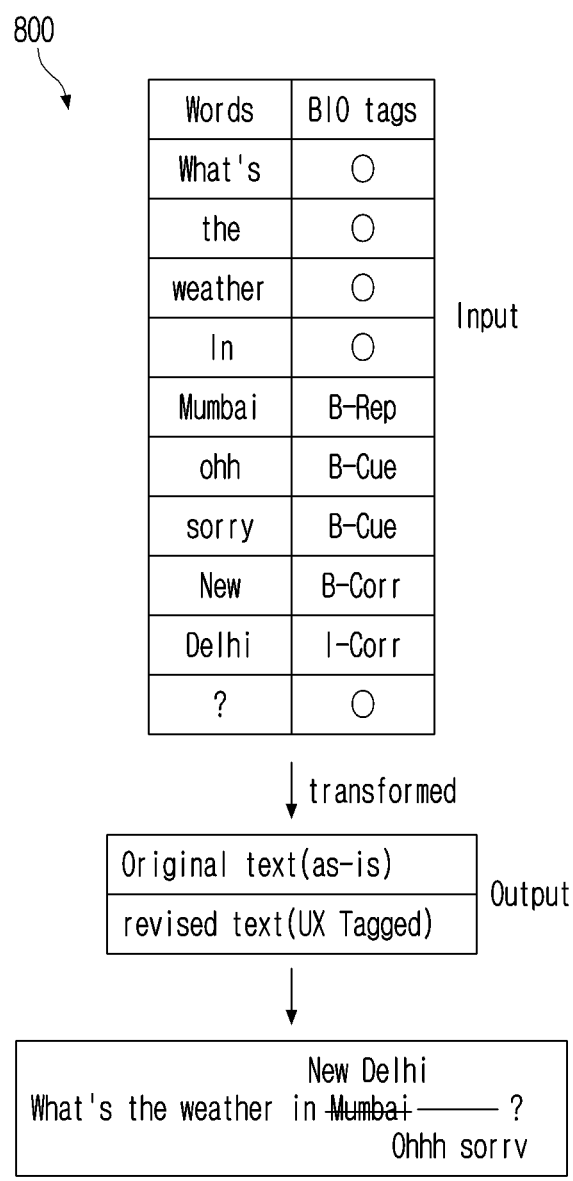
FIG. 8A illustrates a schematic block diagram of the on-the-fly decoding, in accordance with one or more embodiments of the disclosure.

FIG. 8A illustrates a schematic block diagram of the on-the-fly decoding, in accordance with one or more embodiments of the disclosure. This method includes decoding the revised text on-the-fly by the on-the-fly decoder 408 based on the tagged plurality of replacement, cue and correction words comprises. This on-the-fly decoder 408 includes a BIO tag parser 418 which is configured to predict a plurality of BIO tags based CRF model for determining the replacement, cue and correction words, wherein the CRF model is based on the plurality of serially linked attention blocks. It further includes a correction generator 420 which is configured to replace the replacement words with the correction words and removing the cue words based on the predicted BIO tags. In FIG. 8A, the input is the cue and correctional words which are BIO tagged and the output is both the original text without correction and the revised text with the UX tags. The aim of this block is to display the correction organically on the UX. To achieve this, it annotates the text transcript with metadata or the tags that can be understood by any visual language interpreter (UI) and orders the tags so as to help choreograph a sequence of actions in the UI if the interpreter wishes to do so.

FIG. 8B is an illustration of BIO tagged text sequence conversion, in accordance with one or more embodiments of the disclosure. The BIO tagged cue and correctional words are received from the previous operation (FIG. 8A) in its raw form that can be simply understood as a list of individual words having metadata represented with BIO Tags as shown in FIG. 8B. This list is further reduced into blocks of words by adjoining the 'B' and 'I' Tags. Further, the text sequence containing the individual words and the BIO tags are parsed into an iterable list. The list items are iterated and tags starting with 'B' and 'I' are search through the list. Further, the list items are reduced by combining the adjacent items having same or continued tags. The final output contains the cue and correctional blocks instead of a singular word and are marked with either 'B' tag or 'O' tag along with the context like Rep, Corr, Cue etc. . . . as shown in FIG. 8B.

Figure 8C:
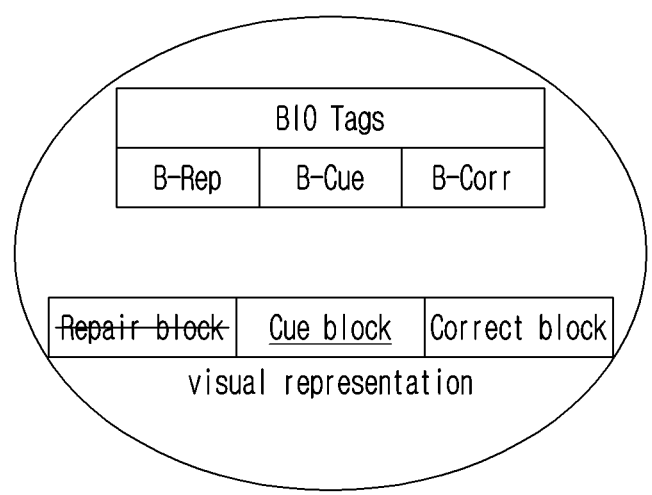
FIG. 8C illustrates mapping BO tags for repairing visualization, in accordance with one or more embodiments of the disclosure.

FIG. 8C is an illustration of mapping BO tags for repairing visualization, in accordance with one or more embodiments of the disclosure. FIG. 8D is an illustration of UX tagged block sequence annotation, in accordance with one or more embodiments of the disclosure. The 'B' and 'O' tagged correctional blocks received from the previous operation (FIG. 8B) has correctional information in the form of B-Rep, B-Cue, B-Corr but it does not give any information on how these tags can be visually represented. The visual cues are required to make necessary adjustments in the UI part of the display device. The blocks can be further enriched with metadata information for UI visualization. Further, a mapping table is created based on FIG. 8C. The 'B' and 'O' tags are replaced with the UX tags by referring at the mapping table in order for actions to be taken in the UI.

Figure 8E:
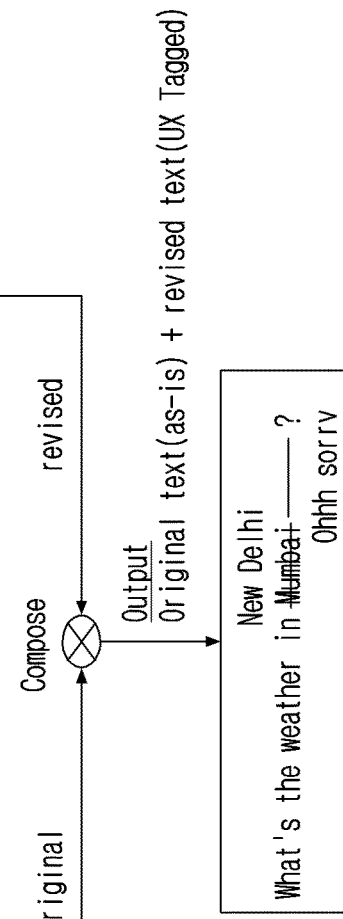
FIG. 8E illustrates final text transcript composition, in accordance with one or more embodiments of the disclosure.

FIG. 8E is an illustration of final text transcript composition, in accordance with one or more embodiments of the disclosure. The aim of this block is to provide both the original unrevised text sequence as well as the revised text sequence as output for the next module to compare and decide the next action. Further, the input 1 is stripped down of BIO Tags and the original text is passed down and the input 2 is taken as it is. Both the inputs are composed into singular data structure and passed down further as the output.

Figure 9A:
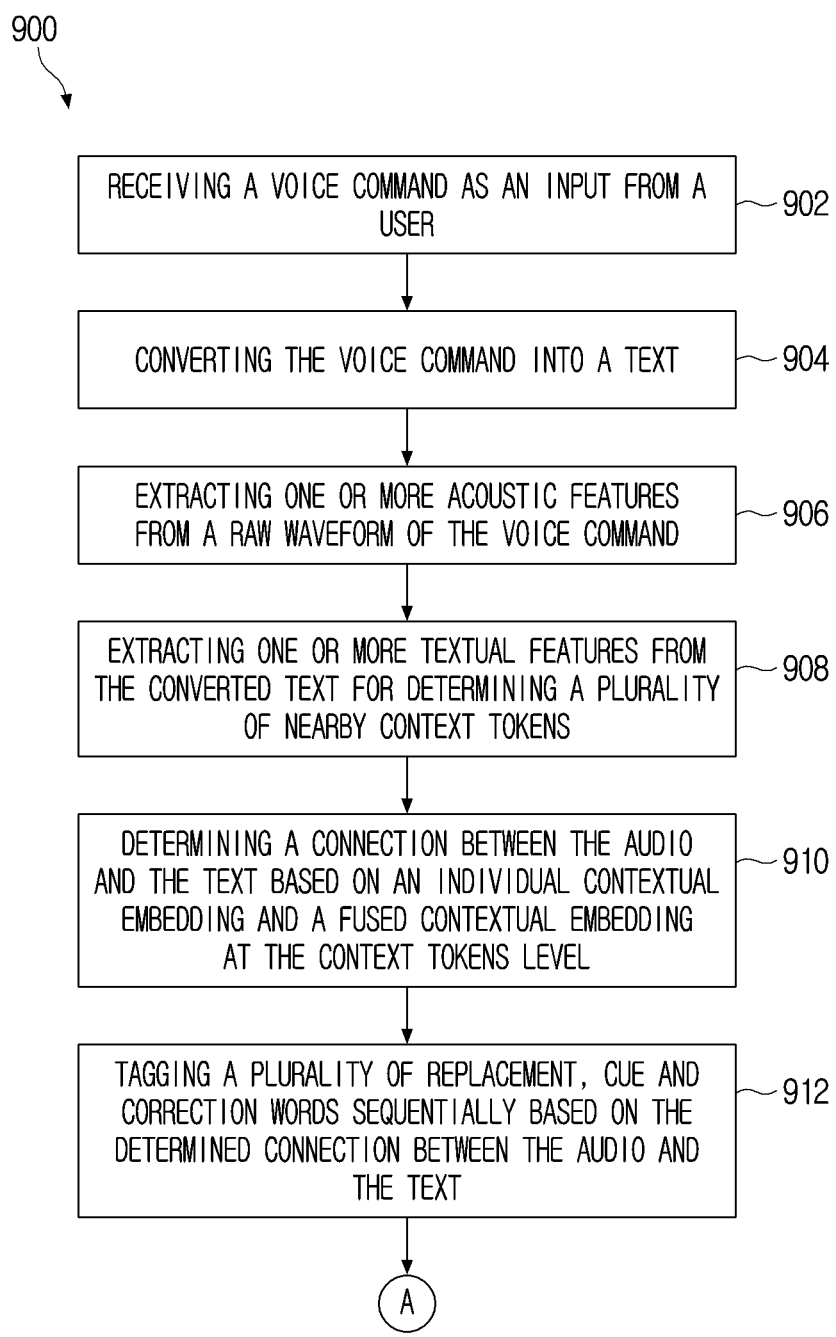
FIGS. 9A and 9B illustrate the method for auto-correction of an ongoing speech command, in accordance with one or more embodiments of the disclosure.
Figure 9B:
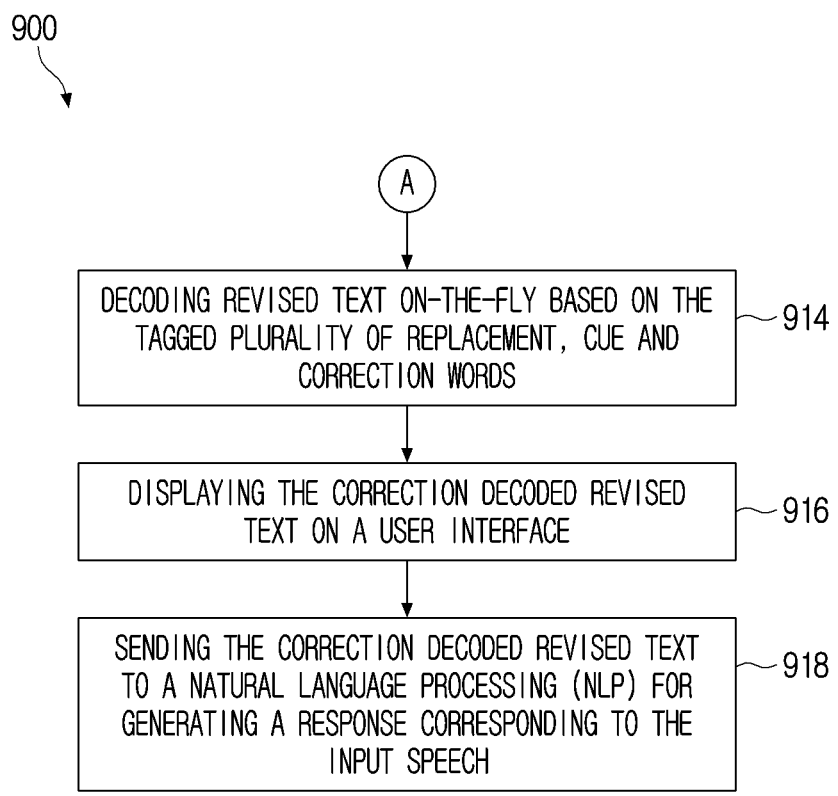

FIGS. 9A and 9B are a flowchart illustrating the method for auto-correction of an ongoing speech command, in accordance with one or more embodiments of the disclosure.

At operation 902, receiving a voice command as an input from a user by a voice assistant. A voice assistant is configured to receive a voice command as an input from a user.

At operation 904, converting the voice command into a text by a speech to text convertor 402. A speech to text convertor 402 is configured to convert the voice command into a text.

At operation 906, extracting one or more acoustic features from a raw waveform of the voice command by a feature extractor 404. A feature extractor 404 is configured to extract one or more acoustic features from a raw waveform of the voice command, wherein the acoustic feature is an audio.

At operation 908, extracting one or more textual features from the converted text for determining a plurality of nearby context tokens by the feature extractor 404. A feature extractor 404 is extract one or more textual features from the converted text for determining a plurality of nearby context tokens.

At operation 910, determining a connection between the audio and the text based on an individual contextual embedding and a fused contextual embedding at the context tokens level by a multi modal unified attention sequence tagger 406. A multi modal unified attention sequence tagger 406 is configured to determine a connection between the audio and the text based on an individual contextual embedding and a fused contextual embedding at the context tokens level.

At operation 912, tagging a plurality of replacement, cue and correction words sequentially based on the determined connection between the audio and the text by the multi modal unified attention sequence tagger 406. A multi modal unified attention sequence tagger 406 is configured to tag a plurality of replacement, cue and correction words sequentially based on the determined connection between the audio and the text.

At operation 914, decoding revised text on-the-fly based on the tagged plurality of replacement, cue and correction words by an on-the-fly decoder 408. An on-the-fly decoder 408 is configured to decode revised text on-the-fly based on the tagged plurality of replacement, cue and correction words.

At operation 916, displaying the decoded revised text on a user interface by the on-the-fly decoder 408. An on-the-fly decoder 408 is configured to display the decoded revised text on a user interface.

At operation 918, sending the decoded revised text to an NLP for generating a response corresponding to the input speech by the on-the-fly decoder 408. An on-the-fly decoder 408 is configured to send the decoded revised text to an NLP to generate a response corresponding to the input speech.

Figure 10:
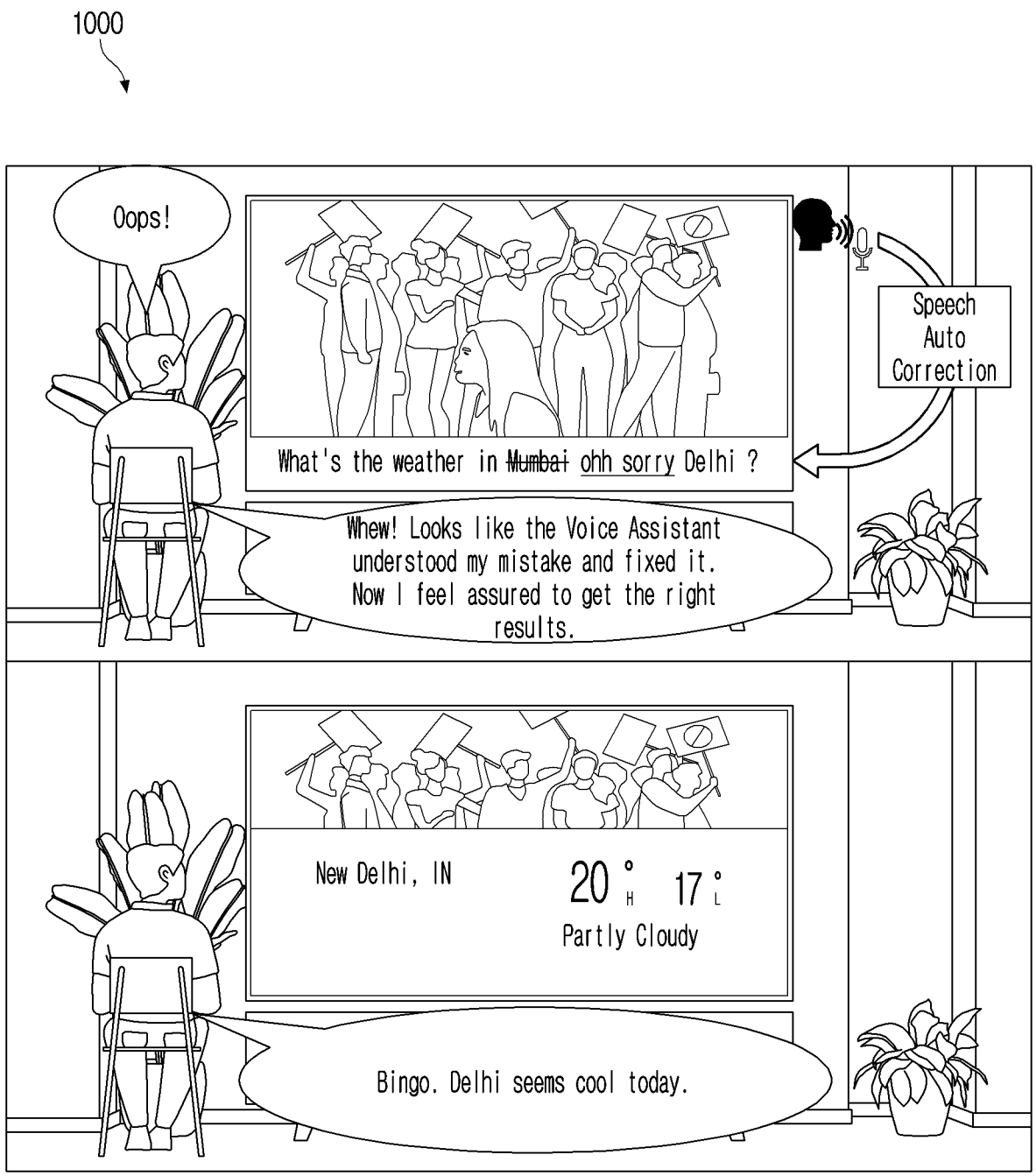
FIG. 10 illustrates an exemplary implementation wherein a correction during voice assistance is illustrated, according to an exemplary implementation of the disclosure.

FIG. 10 demonstrates an exemplary implementation wherein a correction during voice assistance is illustrated, according to an exemplary implementation of the disclosure. A user gives a command to a voice assistant by saying, "what's the weather in Mumbai oh sorry Delhi". With the help of the disclosure, the voice assistant is capable of detecting the disfluency in the command and it provides accurate results by displaying the weather in Delhi and not Mumbai on the screen. Thus, the user does not have to repeat the command as the voice assistant provides accurate results by detecting the cue words i.e., "oh sorry" and replacing the replacement word i.e., Mumbai with the correct word i.e., Delhi.

Figure 11:
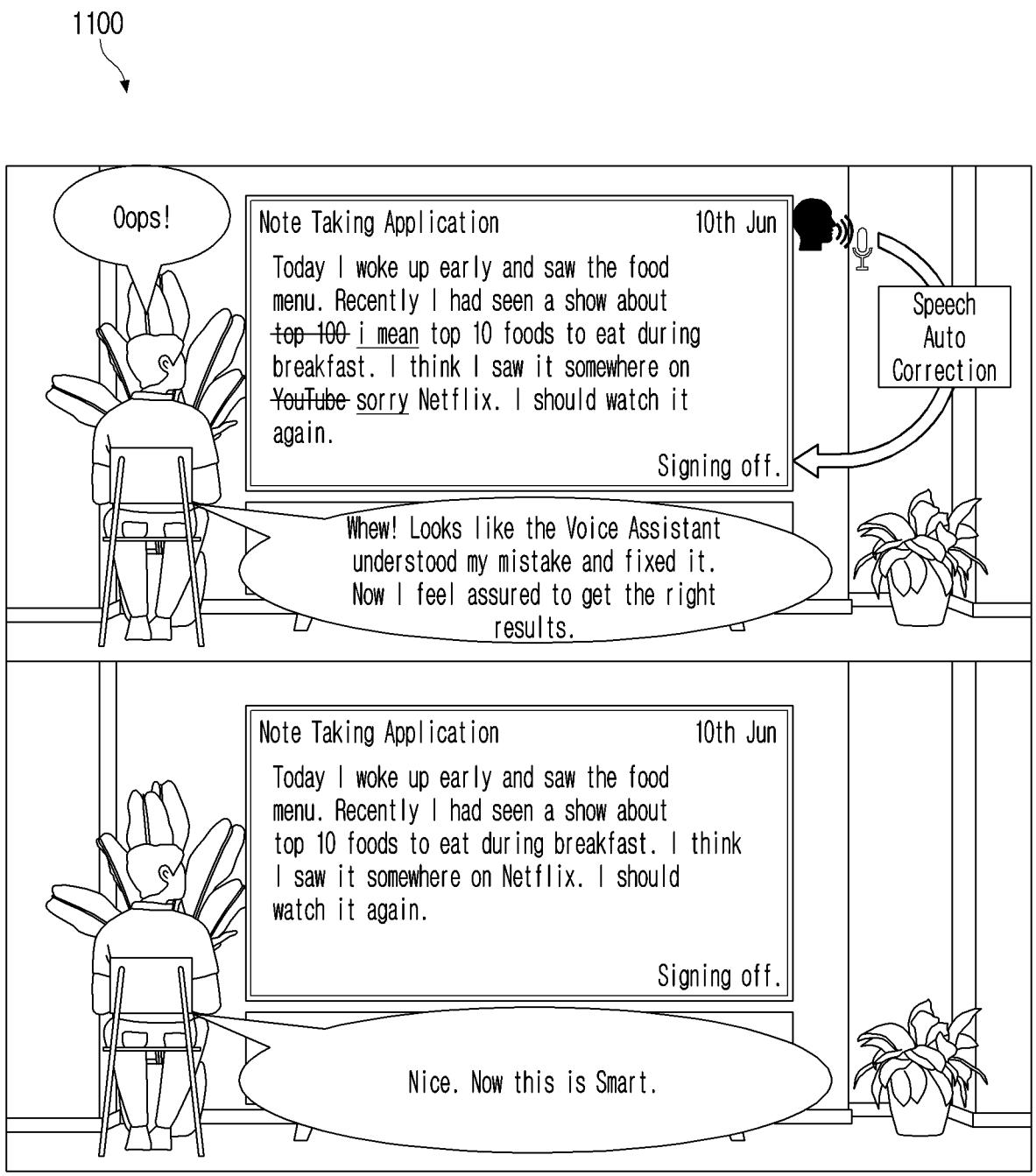
FIG. 11 illustrates an exemplary implementation wherein a correction during dictation is illustrated, in accordance with one or more embodiments of the disclosure.

FIG. 11 demonstrates an exemplary implementation wherein a correction during dictation is illustrated, in accordance with one or more embodiments of the disclosure. A user gives dictation to a voice assistant wherein the user was dictating notes saying, "Today I woke up early and saw the food menu. Recently I had seen a show about top 100 I mean top 10 foods to eat during breakfast. I think I saw it one or morewhere on YouTube sorry Netflix. I should watch it again.". With the help of the disclosure, the voice assistant is capable of detecting the disfluency in the dictation and it provides accurate results by writing the notes correctly as, "Today I woke up early and saw the food menu. Recently I had seen a show about top 10 foods to eat during breakfast. I think I saw it somewhere on Netflix. I should watch it again". Thus, the user does not have to repeat the dictation as the voice assistant provides accurate results by detecting the cue words i.e., "I mean and sorry" and replacing the replacement words with the correct words.

Figure 12:
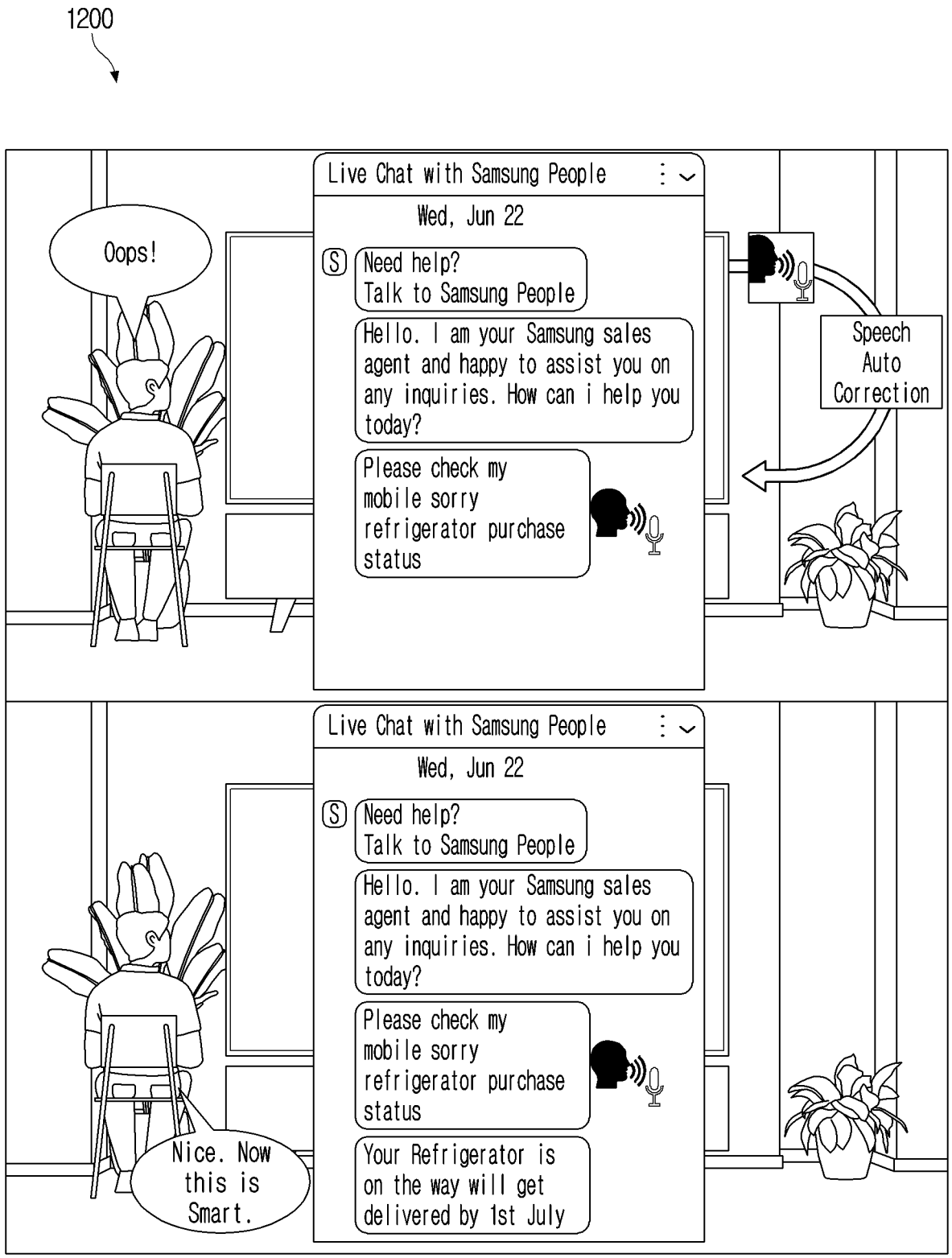
FIG. 12 illustrates an exemplary implementation wherein a voice assistance chat bot is illustrated, in accordance with one or more embodiments of the disclosure.

FIG. 12 demonstrates an exemplary implementation wherein a voice assistance chat bot is illustrated, in accordance with one or more embodiments of the disclosure. A user while chatting with a voice assistant chat bot asks a query by saying, "Please check my mobile sorry refrigerator purchase status". With the help of the disclosure, the voice assistant is capable of detecting the disfluency in the command and it provides accurate results by providing reply as "Your refrigerator is on the way will get delivered by $1^{st}$ July". Thus, the user does not have to repeat the command as the voice assistant provides accurate results by detecting the cue word i.e., "sorry" and replacing the replacement word i.e., Mobile with the correct word i.e., Refrigerator.

Figure 13:
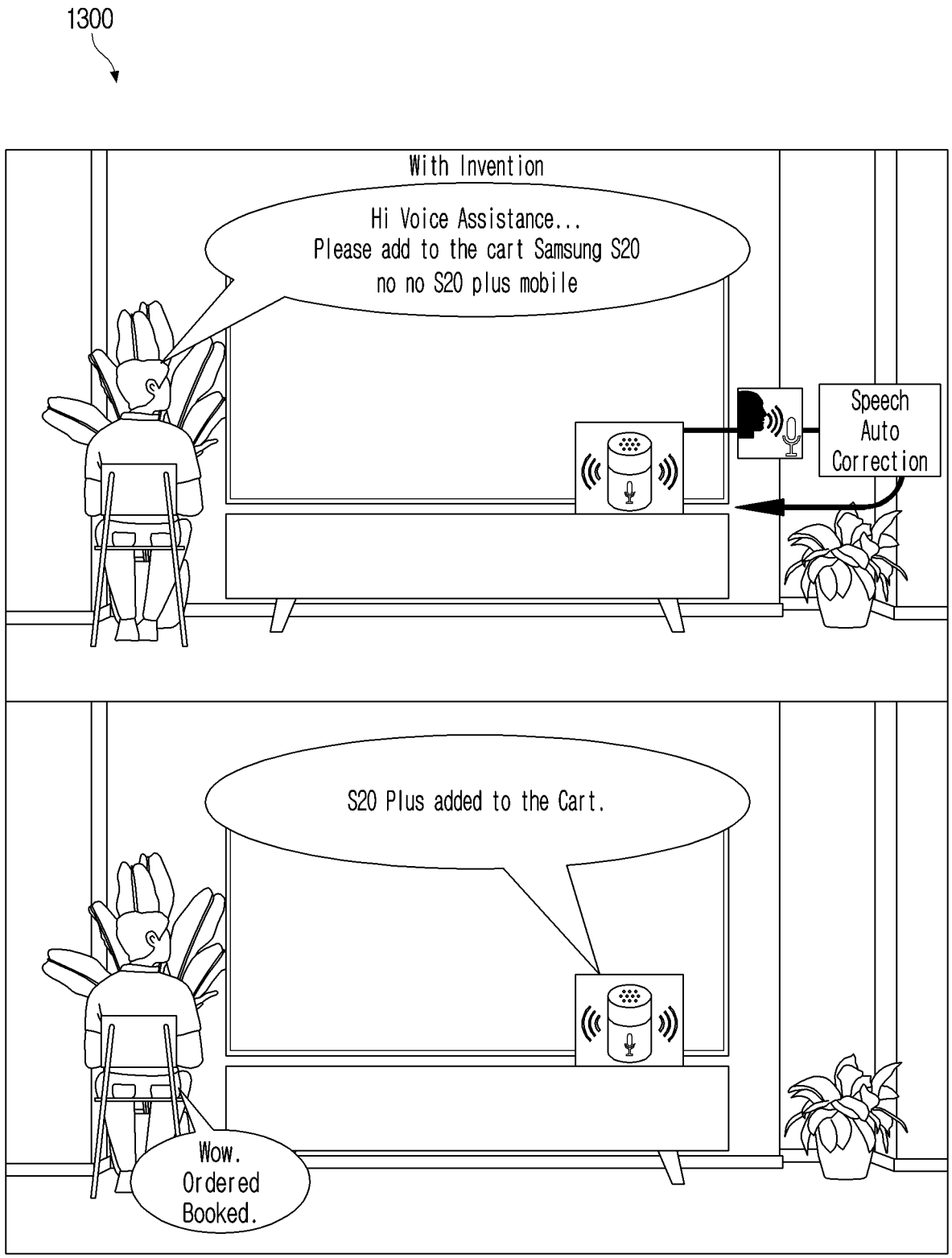
FIG. 13 illustrates an exemplary implementation wherein order management is done with a voice assistance, in accordance with one or more embodiments of the disclosure.

FIG. 13 demonstrates an exemplary implementation wherein order management is done with a voice assistance, in accordance with one or more embodiments of the disclosure. A user while shopping online gives a command to a voice assistant by saying, "Hi Voice Assistance . . . Please add to the cart Samsung S20 no no S20 plus mobile". With the help of the disclosure, the voice assistant is capable of detecting the disfluency in the command and it provides accurate results by adding the required item by the user in the cart and giving a reply by saying "S20 Plus added to the Cart". Thus, the user does not have to repeat the command as the voice assistant provides accurate results by detecting the cue words i.e., "no no" and replacing the replacement word i.e., S20 with the correct word i.e., S20 plus.

In another embodiment, the speech to text convertor, the feature extractor, the multi modal unified attention sequence tagger can be processed on the cloud or the edge device to avoid on-device computation for resource-limited devices.

In another embodiment, the multi modal unified attention sequence tagger can be adjusted and tuned to handle repeating mistakes.

The disclosure has many technical advantages over the existing related arts. One of the main advantages is that the method 300 and the system 400 for auto-correction of an ongoing command focus on the correction context drive and the correction intent on the virtual assistant. Further, the proposed method 300 and the system 400 for auto-correction of an ongoing command is capable of detecting disfluency in the command and the user does not have to repeat the command with correction. Further, said method 300 and system 400 does not use traditional statistical Modelling approaches to model speech disfluencies like 'syntactic language modelling' and 'MaxEnt Ranker algorithm' but represent modern ASR pipelines. Further, said method 300 and system 400 does not focus more on evaluation methods and comparisons like related arts. Further, said method 300 and system 400 auto-corrects an ongoing speech command on the fly.

The description merely illustrates the principles of the disclosure. It will thus be appreciated that those skilled in the art will be able to devise various arrangements that, although not explicitly described herein, embody the principles of the disclosure. Furthermore, all the used cases recited herein are principally intended expressly to be only for explanatory purposes to help the reader in understanding the principles of the disclosure and the concepts contributed by the inventor(s) to furthering the art and are to be construed as being without limitation to such specifically recited used cases and conditions. Moreover, all statements herein reciting principles, aspects, and embodiments of the disclosure, as well as specific examples thereof, are intended to encompass equivalents thereof.

What is claimed is:

1. A method for auto-correction of an ongoing speech command, the method comprising:
   receiving, by a voice assistant, a voice command from a user;
   converting, by a speech to text convertor, the voice command into a text;
   extracting, by a feature extractor, one or more acoustic features from a raw waveform of the voice command, wherein the acoustic feature is an audio;
   extracting, by the feature extractor, one or more textual features from the converted text for determining a plurality of nearby context tokens;
   determining, by a multi modal unified attention sequence tagger, a connection between the audio and the text based on an individual contextual embedding and a fused contextual embedding at a context tokens level;
   tagging, by the multi modal unified attention sequence tagger, a plurality of replacement, cue, and correction words sequentially based on the determined connection between the audio and the text;

decoding, by an on-the-fly decoder, revised text on-the-fly, based on the tagged plurality of replacement, cue and correction words;
displaying, by the on-the-fly decoder, the decoded revised text on a user interface; and
sending, by the on-the-fly decoder, the decoded revised text to a natural language processing (NLP) for generating a response corresponding to an input speech.

2. The method of claim 1, wherein the determining, by the multi modal unified attention sequence tagger, the connection between the audio and the text based on the individual contextual embedding and the fused contextual embedding at the context tokens level comprises:
generating, by the multi modal unified attention sequence tagger, an individual text contextual embedding and an individual audio contextual embedding, based on the plurality of nearby context tokens;
generating, by the multi modal unified attention sequence tagger, a plurality of fused text contextual embedding and a fused audio contextual embedding, based on an interweave attention at each attention block from a plurality of attention blocks;
merging, by the multi modal unified attention sequence tagger, the generated individual text contextual embedding with the fused text contextual embedding and the generated individual audio contextual embedding with the fused audio contextual embedding for obtaining a final text embedding and a final audio embedding respectively;
generating, by the multi modal unified attention sequence tagger, a unified embedding by merging the final text embedding with the final audio embedding; and
linking, by the multi modal unified attention sequence tagger, the plurality of attention blocks serially.

3. The method of claim 1, wherein the converting, by the speech to text convertor, the voice command into the text comprises recognizing the voice command from the raw waveform.

4. The method of claim 1, wherein the one or more acoustic features comprises at least one of pitch, note onsets, fluctuation patterns, stress, or intonation.

5. The method of claim 1, wherein the extracting, by the feature extractor, the one or more acoustic features and the one or more textual features comprises:
extracting, by an acoustic feature extractor, mid-level audio features perceived by the user;
identifying, by the acoustic feature extractor, a disfluent audio point that facilitates in indicating an error made by the user; and
correcting, by the acoustic feature extractor, the error.

6. The method of claim 1, wherein the extracting, by the feature extractor, the one or more acoustic features and the one or more textual features comprises:
converting, by a text feature extractor, the text into a plurality of numeric embeddings; and
refining, by the text feature extractor, the numeric embeddings for identifying the replacement, cue and correction words.

7. The method of claim 2, wherein the generating, by the multi modal unified attention sequence tagger, the individual text contextual embedding and the individual audio contextual embedding comprises:
establishing, by a unified embedding generator, a contextual relation between the plurality of context tokens of an input based on an attention map; and
merging, by the unified embedding generator, the individual text and the individual audio contextual embedding based on the contextual relation for obtaining an output.

8. The method of claim 7, wherein the attention map is a matrix of size N×N comprising a similarity of each token with the other plurality of context tokens.

9. The method of claim 2, wherein each attention block learns improved embedding based on a plurality of modalities.

10. The method of claim 2, wherein the generating, by the multi modal unified attention sequence tagger, the plurality of fused text contextual embedding and the fused audio contextual embedding, based on the interweave attention at each attention block from the plurality of attention blocks comprises:
establishing, by the unified embedding generator, a contextual relation between the plurality of context tokens of a first modality from the plurality of modalities to a second modality from the plurality of modalities based on the attention map; and
merging, by the unified embedding generator, the fused text and the fused audio contextual embedding based on the contextual relation for obtaining an output.

11. The method of claim 9, wherein the plurality of modalities comprises at least one of audio modality or text modality.

12. The method of claim 11, wherein the generating, by the multi modal unified attention sequence tagger, the unified embedding by merging the final text embedding with the final audio embedding comprises:
generating, by a sequence tagger, the context tokens comprising information from the audio modality and the text modality, the context token features being used for tagging.

13. The method of claim 2, wherein the decoding, by the on-the-fly decoder, the revised text on-the-fly, based on the tagged plurality of replacement, cue and correction words comprises:
predicting, by a beginning, inside, and outside (BIO) tag parser, a plurality of BIO tags based on conditional random field (CRF) model for determining the replacement, cue and correction words, wherein the CRF model is based on the plurality of serially linked attention blocks; and
replacing, by a correction generator, the replacement words with the correction words and removing the cue words based on the predicted plurality of BIO tags.

14. The method of claim 13, wherein the displaying, by the on-the-fly decoder, the decoded revised text on the user interface comprises:
revising the text with the predicted BIO tags; and
arranging the BIO tags for creating a sequence of actions in the user interface.

15. A system for auto-correction of an ongoing speech command, the system comprising:
a voice assistant configured to receive a voice command as an input from a user;
a speech to text convertor configured to convert the voice command into a text;
a feature extractor configured to:
extract one or more acoustic features from a raw waveform of the voice command, wherein the acoustic feature is an audio; and
extract one or more textual features from the converted text for determining a plurality of nearby context tokens;

a multi modal unified attention sequence tagger configured to:
  determine a connection between the audio and the text based on an individual contextual embedding and a fused contextual embedding at a context tokens level; and
  tag a plurality of replacement, cue and correction words sequentially based on the determined connection between the audio and the text; and
an on-the-fly decoder configured to:
  decode revised text on-the-fly based on the tagged plurality of replacement, cue and correction words;
  display the decoded revised text on a user interface; and
  send the decoded revised text to a natural language processing (NLP) to generate a response corresponding to an input speech.

16. The system of claim 15, wherein the multi modal unified attention sequence tagger is further configured to:
  generate an individual text contextual embedding and an individual audio contextual embedding based on the plurality of nearby context tokens;
  generate a plurality of fused text contextual embedding and a fused audio contextual embedding based on an interweave attention at each attention block from a plurality of attention blocks;
  merge the generated individual text contextual embedding with the fused text contextual embeddings and the generated individual audio contextual embedding with the fused audio contextual embeddings to obtain a final text embedding and a final audio embedding respectively;
  generate a unified combined embedding by merging the final text embedding with the final audio embedding; and
  link the plurality of attention blocks serially.

17. The system of claim 15, wherein the speech to text convertor is further configured to recognize the voice command from the raw waveform.

18. The system of claim 15, wherein the feature extractor further comprises an acoustic feature extractor which is configured to:
  extract mid-level audio features perceived by the user;
  identify a disfluent audio point that facilitates in indicating an error made by the user; and
  correct the error.

19. The system of claim 15, wherein the feature extractor further comprises a text feature extractor which is configured to:
  convert the text into a plurality of numeric embeddings; and
  refine the numeric embeddings for identifying the replacement, cue and correction words.

20. The system of claim 16, wherein the multi modal unified attention sequence tagger comprises a unified embedding generator which is configured to:
  establish a contextual relation between the plurality of context tokens of an input based on an attention map; and
  merge the individual text contextual embedding and the individual audio contextual embedding based on the contextual relation for obtaining an output.

* * * * *